United States Patent
Kubota

(10) Patent No.: US 9,557,481 B2
(45) Date of Patent: Jan. 31, 2017

(54) OPTICAL WAVEGUIDE HAVING HOLLOW SECTION AND ELECTRONIC DEVICE INCLUDING OPTICAL WAVEGUIDE

(71) Applicant: SUMITOMO BAKELITE CO., LTD., Shinagawa-ku (JP)

(72) Inventor: Sho Kubota, Tokyo (JP)

(73) Assignee: SUMITOMO BAKELITE CO., LTD., Shinagawa-ku (JP)

( * ) Notice: Subject to any disclaimer, the term of this patent is extended or adjusted under 35 U.S.C. 154(b) by 0 days.

(21) Appl. No.: 14/778,882

(22) PCT Filed: Mar. 24, 2014

(86) PCT No.: PCT/JP2014/057989
§ 371 (c)(1),
(2) Date: Sep. 21, 2015

(87) PCT Pub. No.: WO2014/157039
PCT Pub. Date: Oct. 2, 2014

(65) Prior Publication Data
US 2016/0047978 A1    Feb. 18, 2016

(30) Foreign Application Priority Data

Mar. 29, 2013  (JP) ................................ 2013-075387
Nov. 26, 2013  (JP) ................................ 2013-243997

(51) Int. Cl.
G02B 6/12      (2006.01)
G02B 6/42      (2006.01)
G02B 6/122     (2006.01)

(52) U.S. Cl.
CPC ............ G02B 6/122 (2013.01); G02B 6/4214 (2013.01)

(58) Field of Classification Search
CPC ............................. G02B 6/4214; G02B 6/122
(Continued)

(56) References Cited

U.S. PATENT DOCUMENTS 5,953,477 A * 9/1999 Wach ................. A61B 5/14546
                                                   385/115
6,419,810 B1 * 7/2002 Tanaka ..................... C25D 1/02
                                                    205/50
(Continued)

FOREIGN PATENT DOCUMENTS

JP    2005 294407    10/2005
JP    2006 267154    10/2006
(Continued)

OTHER PUBLICATIONS

International Search Report issued Jun. 24, 2014 in PCT/JP2014/057989 filed Mar. 24, 2014.

Primary Examiner — Akm Enayet Ullah
(74) Attorney, Agent, or Firm — Oblon, McClelland, Maier & Neustadt, L.L.P.

(57) ABSTRACT

A optical waveguide comprising a core layer having a core portion; a first clad layer formed on one surface of the core layer; a second clad layer formed on another surface of the core layer; and a hollow section penetrating through the second clad layer and the core layer, and extending to a middle portion of the first clad layer, wherein a part of an inner wall surface at the hollow section is configured as an inclined plane which is inclined relative to and intersects with a plane including an interfacial plane between the core layer and the first clad layer, and a minimum radius of curvature at a connection between the inclined plane and other parts of the inner wall surface continuously extending from the inclined plane is 1 to 500 μm as measured at the plane including the interfacial plane.

20 Claims, 10 Drawing Sheets

(58) Field of Classification Search
USPC .................................. 385/125–129, 31–37
See application file for complete search history.

(56) References Cited

U.S. PATENT DOCUMENTS

| | | | | |
|---|---|---|---|---|
| 6,542,658 | B2* | 4/2003 | Takeuchi | G02B 6/3522 385/14 |
| 6,842,550 | B2* | 1/2005 | Takeuchi | G02B 6/3522 385/16 |
| 6,944,377 | B2* | 9/2005 | Umebayshi | G02B 6/12002 385/49 |
| 7,324,723 | B2* | 1/2008 | Shioda | G02B 6/122 385/129 |
| 8,139,181 | B2* | 3/2012 | Yoshihara | G02B 1/105 156/324 |
| 8,755,255 | B2* | 6/2014 | Hirata | G11B 5/314 369/13.13 |
| 8,787,127 | B2* | 7/2014 | Hirata | G11B 5/314 360/245.3 |
| 2005/0287696 | A1* | 12/2005 | Dumais | B82Y 10/00 438/69 |
| 2009/0215281 | A1* | 8/2009 | Mungekar | C23C 16/045 438/786 |
| 2010/0067861 | A1* | 3/2010 | Choki | C08L 51/003 385/131 |
| 2011/0085771 | A1* | 4/2011 | Matsuyama | G02B 6/43 385/125 |
| 2012/0219251 | A1* | 8/2012 | Kuroda | G02B 6/122 385/14 |
| 2013/0170803 | A1 | 7/2013 | Mori et al. | |
| 2013/0287335 | A1* | 10/2013 | Nakashiba | G02B 6/122 385/14 |
| 2015/0016794 | A1* | 1/2015 | Mori | G02B 6/1221 385/124 |
| 2015/0168646 | A1* | 6/2015 | Arai | G02B 6/122 385/14 |

FOREIGN PATENT DOCUMENTS

| | | |
|---|---|---|
| JP | 2009 92940 | 4/2009 |
| JP | 2011 128237 | 6/2011 |
| JP | 2012 68632 | 4/2012 |
| JP | 2012 208306 | 10/2012 |

* cited by examiner

OPTICAL WAVEGUIDE HAVING HOLLOW SECTION AND ELECTRONIC DEVICE INCLUDING OPTICAL WAVEGUIDE

TECHNICAL FIELD

The present invention relates to an optical waveguide and an electronic device.

This application claims priority from Japanese Patent Application No. 2013-075387 filed on Mar. 29, 2013 and Japanese Patent Application No. 2013-243997 filed on Nov. 26, 2013, the content of which is incorporated herein by reference.

BACKGROUND ART

In recent years, the use of an optical waveguide has been spreading as a means for guiding an optical signal from one point to another. The optical waveguide comprises a linear core portion and a clad portion surrounding the core portion. The core portion is formed of a material which is substantially transparent to light, and the clad portion is formed of a material having a lower refractive index than the core portion.

In the waveguide, the light introduced into the waveguide from one end of the core portion is transmitted to another end of the core portion while being reflected at the interface between the core portion and the clad portion. When the waveguide is used, a light emitting element such as a semiconductor laser is provided near the light incident side of the waveguide, and a light receiving element such as a photo diode is provided near the light emission side of the waveguide. The light emitted from the light emitting element enters and travels in the waveguide, and is received by the receiving element. Through such a waveguide, a communication is performed based on the intensity or blink pattern of the light.

Substituting the electric wiring of a signal processing board with the waveguide, for example, solves a problem peculiar to an electrical signal such as generation of a high-frequency noise or degradation of the electrical signal; therefore, such substitution with the waveguide is expected to further enhance the throughput of the signal processing board.

For substituting the electric wiring with the waveguide, a mutual exchange between electrical signal and optical signal is necessary. For this purpose, a waveguide module provided with the waveguide optically connecting the light emitting element and the light receiving element is being developed.

For example, Patent Document 1 describes an optical interface having a printed board, a light emitting element on the printed board, and an optical waveguide formed on the lower surface of the printed board. Further, the optical waveguide and the light emitting element are optically connected through the through hole formed on the printed board for transmitting the optical signal.

In the optical interface as described above, it is necessary to divert the path of light by a mirror formed in the waveguide for making the signal light emitted from the emission portion of the light emitting element enter the core portion of the waveguide.

The mirror as described above may be, for example, one configured to have an inclined plane traversing only the waveguide in the core portion thereof, or may be one configured to have an inclined plane as described in Patent Document 2, which is continuously formed from the core portion to the clad layer laminated thereon. Patent Document 2 discloses a technique in which an under clad layer, a core and an over clad layer are laminated together, followed by providing at one end of the resulting laminate an inclined plane which is inclined relative to the axial direction of the core, i.e. the longitudinal direction, with an inclination angle of 45°, where the inclined plane is utilized as a light reflecting surface of a waveguide.

PRIOR ART DOCUMENTS

Patent Documents

Patent Document 1: Japanese Unexamined Patent Application, Publication No. 2005-294407
Patent Document 2: Japanese Unexamined Patent Application, Publication No. 2012-208306

DISCLOSURE OF INVENTION

Problems to be Solved by the Invention

However, there is a concern about a problem that an inclined plane provided in the laminate leads to a separation between the core and the clad layer, which results in the degradation of the transmission characteristic of the waveguide and reflection characteristic of the mirror.

The objectives of the present invention are to provide an optical waveguide enabling high-quality optical communication while suppressing degradation of the transmission characteristic and to provide an electronic device provided with such an optical waveguide.

Means for Solving the Problems

These objectives are achieved by the present invention as enumerated in items (1) to (11) below:

(1) An optical waveguide comprising a core layer having a core portion; a first clad layer formed on one surface of the core layer; a second clad layer formed on another surface of the core layer; and a hollow section penetrating through the second clad layer and the core layer, and extending to a middle portion of the first clad layer,
   wherein a part of an inner wall surface at the hollow section is configured as an inclined plane which is inclined relative to and intersects with a plane including an interfacial plane between the core layer and the first clad layer, and
   a minimum radius of curvature at a connection between the inclined plane and other parts of the inner wall surface continuously extending from the inclined plane is 1 to 500 µm as measured at the plane including the interfacial plane (2) The optical waveguide according to (1), wherein:
   the hollow section is formed at the core portion or at a position extended longitudinally from the core portion, and
   the inclined plane traverses an optical axis of the core portion or a line extended therefrom.

(3) The optical waveguide according to (1) or (2), wherein a minimum radius of curvature at a connection between the inclined plane and other parts of the inner wall surface continuously extending from the inclined plane is 1 to 500 µm as measured at a position of the hollow section corresponding to a surface of the second clad layer which is opposite to the core layer.

(4) The optical waveguide according to any one of (1) to (3), wherein a minimum radius of curvature at a connection between the inclined plane and other parts of the inner wall surface continuously extending from the inclined plane is 1 to 500 μm as measured at an interfacial plane between the second clad layer and the core layer.

(5) The optical waveguide according to any one of (1) to (4), further comprising a cover layer laminated with the second clad layer on its side opposite to the core layer.

(6) The optical waveguide according to any one of (1) to (5), wherein the inner wall surface at the hollow section includes an upright plane which intersects with the plane including the interfacial plane at an acute angle of 60° to 90°.

(7) The optical waveguide according to any one of (1) to (6), wherein the inclined plane intersects with the plane including the interfacial plane at an acute angle of 20° to 90°.

(8) The optical waveguide according to (6) or (7), wherein the inner wall surface at the hollow section includes a pair of said inclined planes and a pair of said upright planes,
   the hollow section being configured such that the inclined planes are positioned opposite to each other and the upright planes are positioned opposite to each other as viewed with respect to a cross section of the hollow section at the plane including the interfacial plane.

(9) The optical waveguide according to any one of (6) to (8), wherein the upright plane is curved along a longitudinal direction of the optical waveguide.

(10) The optical waveguide according to any one of (1) to (5), wherein the inner wall surface at the hollow section forms an acute angle with the plane including the interfacial plane as measured at a side opposite to the hollow section.

(11) An electronic device comprising the optical waveguide according to any one of (1) to (10).

Effects of the Invention

According to the present invention, it is possible to obtain an optical waveguide enabling high-quality optical communication while suppressing degradation of the transmission characteristic.

According to the present invention, it is also possible to obtain a highly reliable electronic device which is provided with the optical waveguide.

MODE FOR CARRYING OUT THE INVENTION

Hereinbelow, the optical waveguide and the electronic device of the present invention are described in detail based on the preferred embodiments shown in the annexed drawings.

<Optical Waveguide>

First Embodiment

First, the first embodiment of the optical waveguide of the present invention is described as follows.

Figure 1:
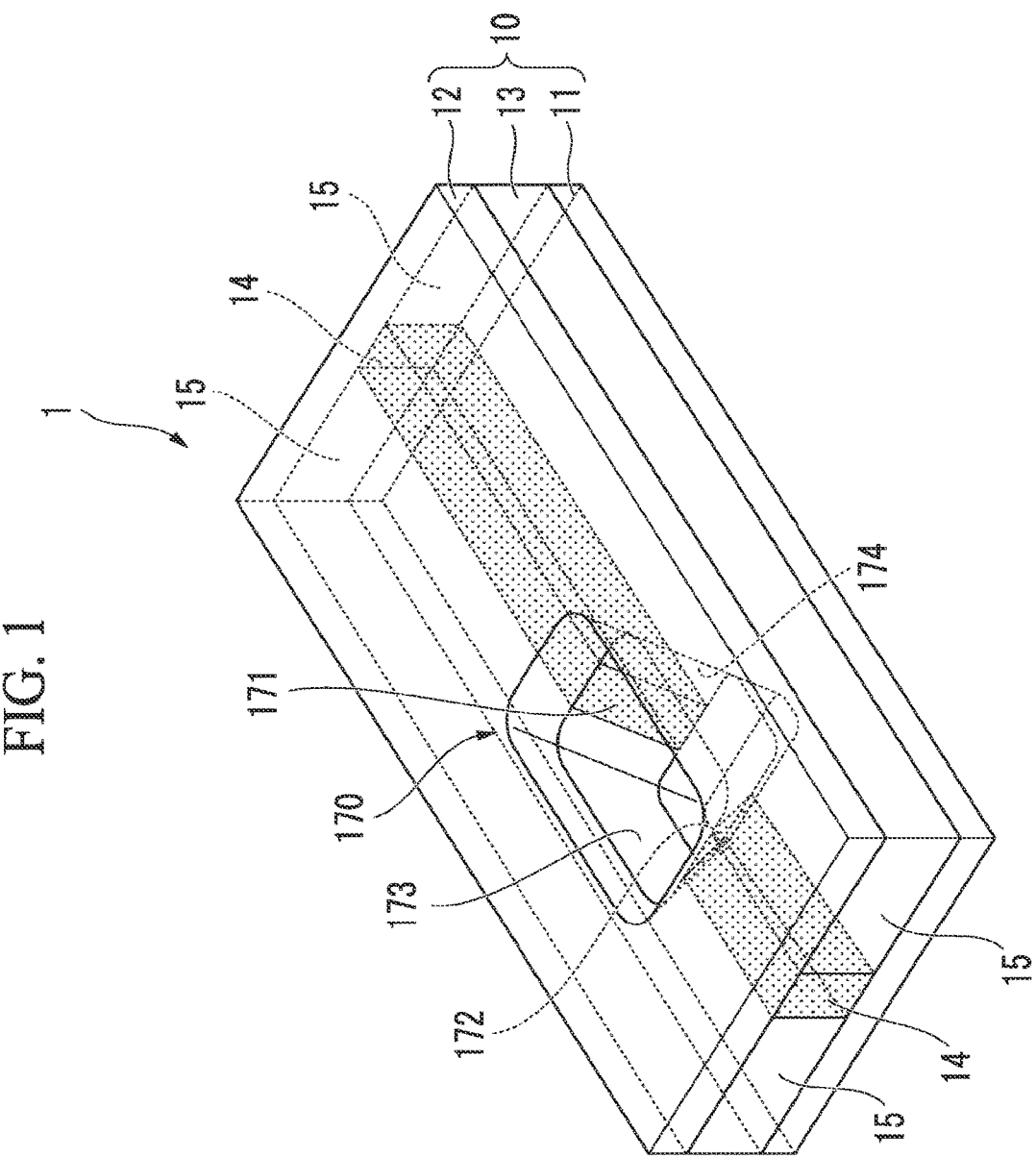
FIG. 1 is a perspective view of one embodiment of the optical waveguide of the present invention with the parts thereof shown transparent.
Figure 2:
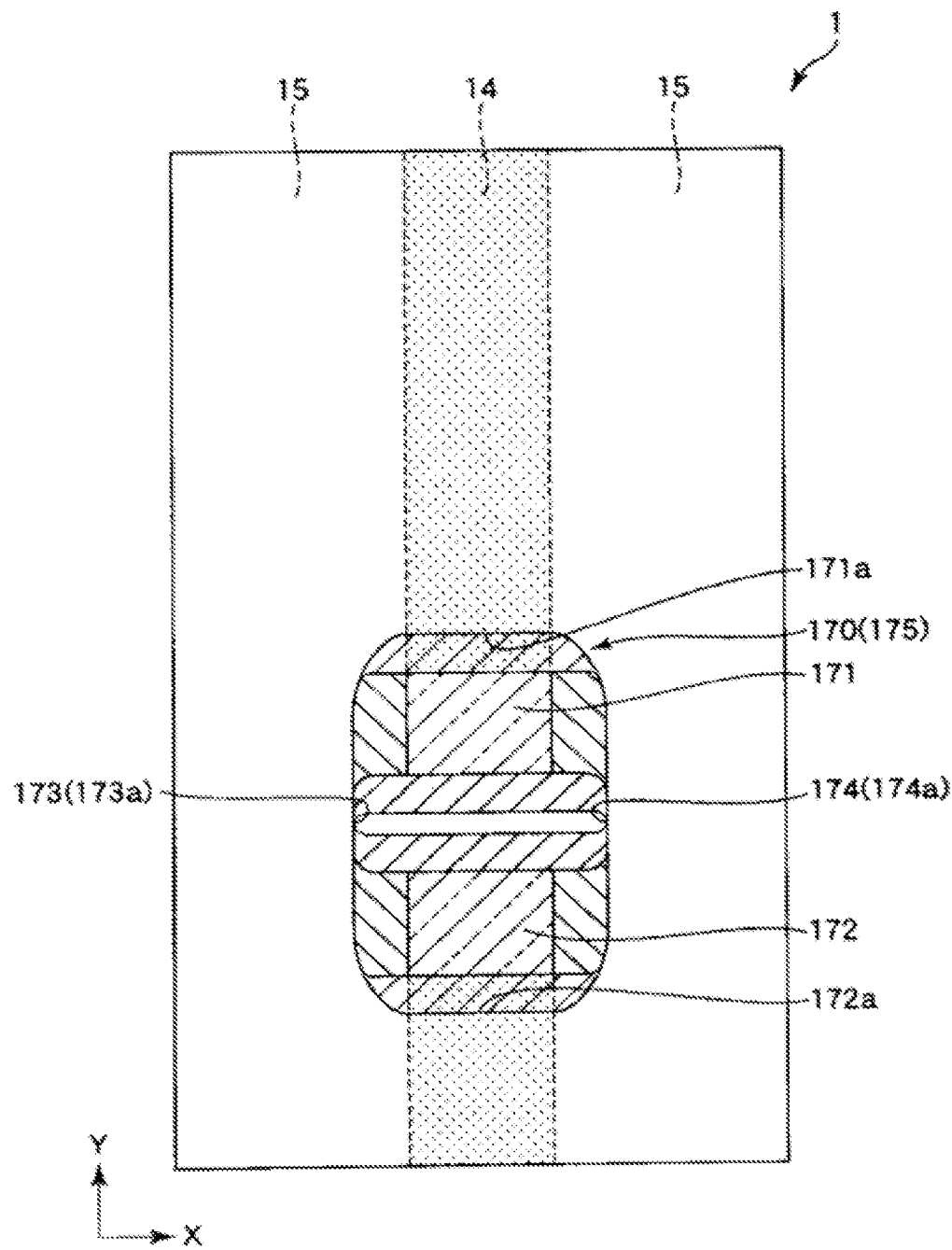
FIG. 2 is a plan view of the optical waveguide of FIG. 1.
Figure 3:
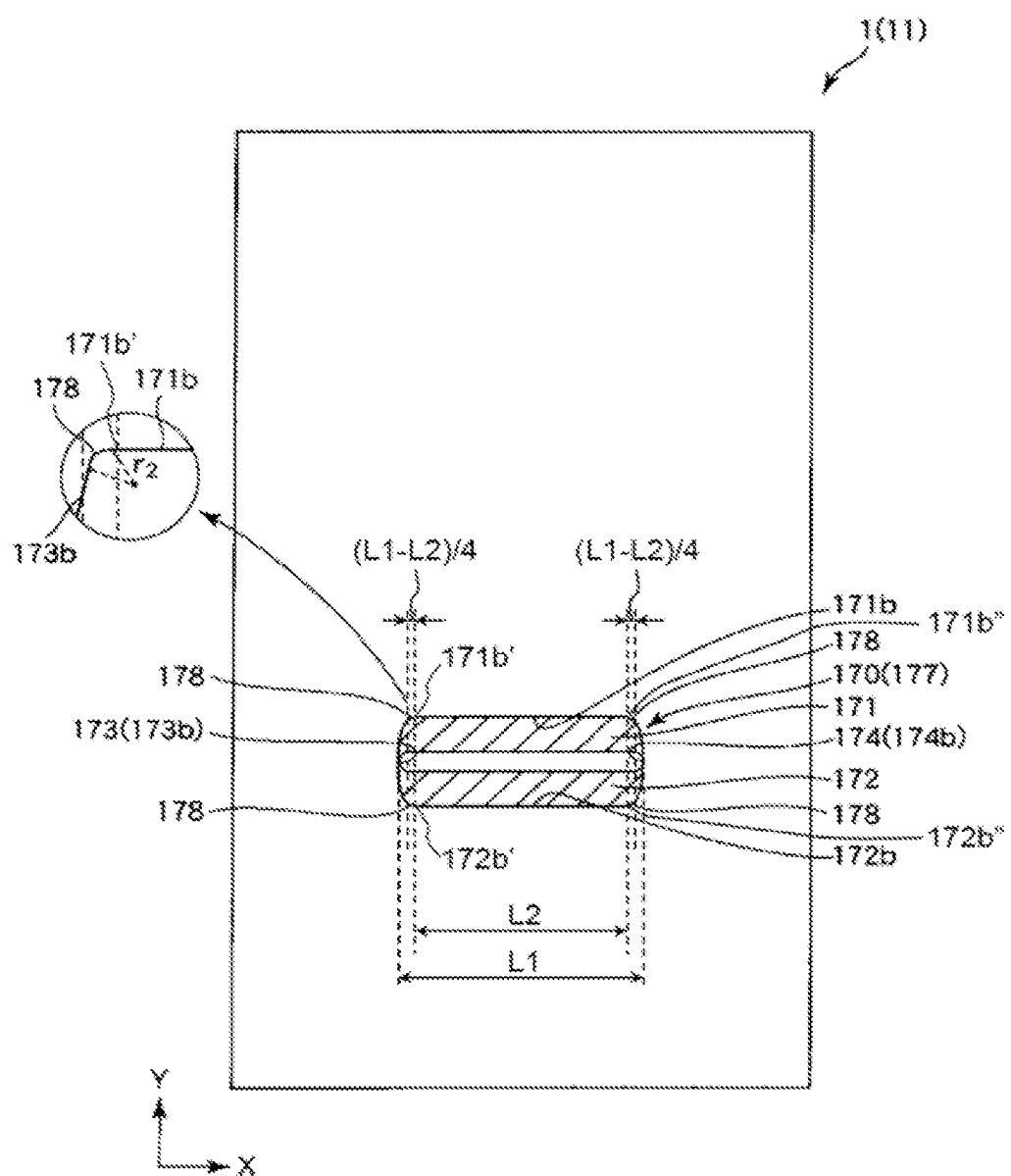
FIG. 3 is a schematic plan view of an opening in the concavity (hollow section) of the optical waveguide of FIG. 2 as viewed at a section cut along the interfacial plane between the core layer and the first clad layer.
Figure 4:
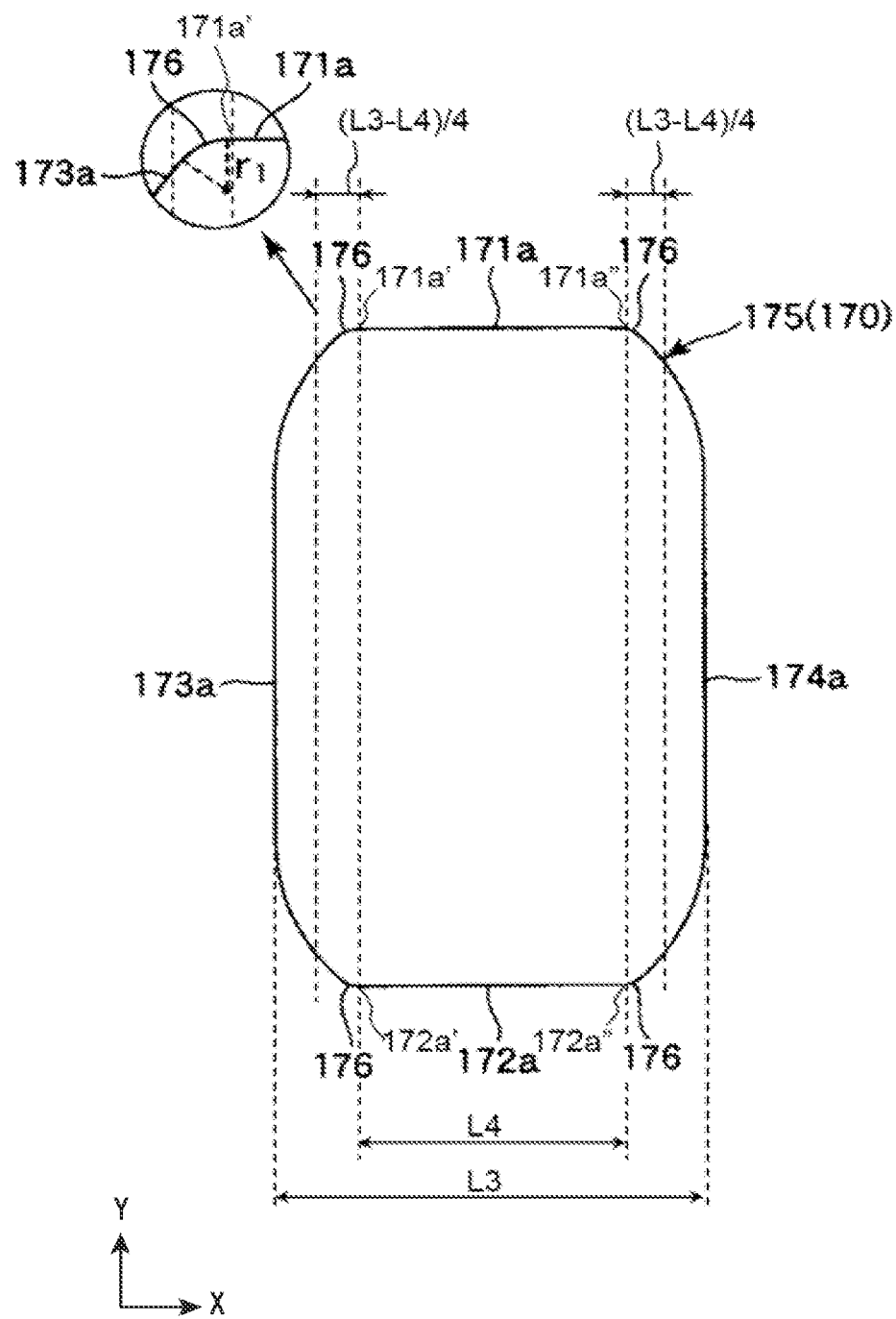
FIG. 4 is a schematic plan view of the opening in the concavity (hollow section) of the optical waveguide.

FIG. 1 is a perspective view of one embodiment of the optical waveguide of the present invention with the parts thereof shown transparent. FIG. 2 is a plan view of the optical waveguide of FIG. 1. FIG. 3 is a schematic plan view of an opening in the concavity (hollow section) of the optical waveguide of FIG. 2 as viewed at a section cut along the interfacial plane between the core layer and the first clad layer. FIG. 4 is a schematic plan view of the opening in the concavity (hollow section) of the optical waveguide.

The optical waveguide 1 shown in FIG. 1 has a belt-like shape and performs optical communication by transmitting optical signals between the light receiving section and the light emitting section.

The optical waveguide 1 shown in FIG. 1 is provided with a laminated body 10 where a clad layer 11, a core layer 13 and a clad layer 12 are successively laminated in this order as viewed from bottom to top. The core layer 13 has formed therein a longitudinally extending core portion 14 and side clad portions 15 adjacent to the both sides the core portion 14. In FIG. 1 and FIG. 2, the core portion 14 and the side clad portions 15, each present in the core layer 13, are shown through the clad layer 12 with dotted lines.

Each of the width of the core portion 14 and the height of the core portion 14 (i.e., thickness of the core layer 13) is not particularly limited, but is preferably 1 to 200 μm, more preferably 5 to 100 μm. When the dimension of the core portion 14 is within this range, the density of the core portion 14 in the core layer 13 can be increased to thereby improve the efficiency of transmission of light through the optical waveguide. That is, the number of the core portions 14 installable per unit area in the optical waveguide can be increased; therefore, a large capacity optical communication is possible even if the total area of the optical waveguide itself is small.

The number of core portion 14 formed in the core layer 13 is not particularly limited and is, for example, 1 to 100.

With respect to the refractive index distribution of the optical waveguide 1, each of the distribution in the widthwise direction and the distribution in the thicknesswise direction may either be of a step index (SI) type where the refractive index discontinuously varies or of a graded index (GI) where the refractive index continuously varies.

In the optical waveguide 1, the concavity (hollow section) 170 is formed by removing a part of the optical waveguide 1. That is, the optical waveguide 1 is provided with the laminated body 10 and the concavity 170 formed therein. The concavity 170 shown in FIG. 1 is located at a middle region of the core portion 14 in the longitudinal direction. A part of the inner surface at the concavity is an inclined plane 171 which is inclined relative to the optical axis of the core portion 14, i.e., the longitudinal direction of the core portion 14. In other words, the inclined plane 171 is inclined relative to and intersects with the interfacial plane between the core layer 13 and the clad layer 11. Such an inclined plane 171 functions as a mirror converting the path of light from the core portion 14 (referred to as light path conversion part). That is, the mirror configured as the inclined plane 171 converts the transmission direction of light by reflecting the light transmitted from upper side to lower side in FIG. 2 toward the direction of the back side of the paper showing FIG. 2.

The concavity 170 may have a trapezoid shape which is narrower at the bottom thereof and wider at the opening thereof as viewed with respect to a section cut along the plane which orthogonally intersects the upper surface of the clad layer 12 and is parallel to the longitudinal direction of the core portion 14. Alternatively, the concavity 170 may have a triangle shape with its apex being located at the bottom of the concavity as viewed with respect to a section cut along the plane which orthogonally intersects the upper surface of the clad layer 12 and is parallel to the longitudinal direction of the core portion 14.

The inclined plane 171 is a flat plane continuously formed through the clad layer 12 and the core layer 13, and extending to a middle portion of the clad layer 11 as shown in FIG. 1 and FIG. 2. Other inclined plane 172 is formed in the inner surface of the concavity 170 at a location opposite to the inclined plane 171. The inclined plane 172 is also a flat plane continuously formed through the clad layer 12 and the core layer 13, and extending to a middle portion of the clad layer 11 as in the case of the inclined plane 171.

On the other hand, two planes in the inner surface of the concavity 170, which are substantially parallel to the optical axis, i.e. the longitudinal direction, of the core portion 14 are the upright planes 173 and 174. The upright planes 173 and 174 are perpendicular to the bottom surface of the clad layer 11. The upright planes 173 and 174 are slightly curved in a plan view of the interfacial plane between the core layer 13 and the clad layer 11 as shown in FIG. 2.

The inner surface of the concavity 170 is constituted of two inclined planes 171 and 172 and the two upright planes 173 and 174 which are as described above.

In general, unintended problems regarding transmission characteristic and/or reflection characteristic possibly arise when a concavity is formed in an optical waveguide. Since such problems arise highly frequently when an acceleration test such as a temperature cycle test is performed on the optical waveguide, it is considered that some chemical or structural defects occur in the optical waveguide due to the load caused by the acceleration test.

The present inventors made intensive searches and studies about the cause of such problems occurring when the optical waveguide provided with such a concavity is used. As a result, they have found that the troubles are caused by the interlayer separation occurring around the concavity, specifically, the interlayer separation occurring between the core layer and the clad layer around the inclined plane. Further, they have found that the concavity having an opening with a specific shape meeting certain conditions can suppress such interlayer separation, thereby removing the defects occurring at the optical waveguide.

Specifically, when the opening in the concavity 170 in the plane including the interfacial plane between the core layer 13 and the clad layer 11 is defined as "opening 177", the opening 177 in a plan view has an oval shape formed by the straight line segments 171b and 172b that correspond to the inclined planes 171 and 172 respectively, and the arcs 173b and 174b that join (continue from) the straight line segments 171b and 172b, and correspond to the upright planes 173 and 174 respectively. The opening 177 is curved at each connection 178 between the straight line segment 171b or 172b and the arc 173b or 174b with a minimum radius of curvature of 1 to 500 μm (see radius of curvature $r_2$ in FIG. 3).

The concavity 170 having the shape described above can alleviate the stress concentration around the concavity 170. As a result, the optical waveguide with such a concavity can suppress the occurrence of cracks originating from the point where stress is concentrated and the occurrence of delamination around the concavity 170. Thus, the optical waveguide 1 of the present invention realizes high-quality optical communication while suppressing degradation of the transmission efficiency through the optical waveguide 1 and the reflection efficiency on the inclined surface 171.

The minimum radius of curvature $r_2$ is preferably 3 to 400 μm, more preferably 5 to 350 μm, even more preferably 10 to 100 μm, most preferably 20 to 40 μm.

When the minimum radius of curvature of each connection 178 is below the lower limit described above, stress tends to concentrate at the connection 178, thereby increasing the possibility of occurrences of the cracks originating therefrom and the delamination. On the other hand, the minimum radius of curvature of each connections 178 exceeds the upper limit described above, no further improvement can be expected as far as the prevention of the aforementioned problems by the minimum radius of curvature is concerned, while there arises a problem that the opening 177 necessarily becomes too large to form concavity 170 of a desired small size.

The connection 178 is a part of the opening 177 in FIG. 3, and is, for example, positioned between a part of the straight line segment 171b corresponding to the inclined plane 171 and a part of the arc 173b (other part) corresponding to the upright plane 173. Specifically, as explained referring to FIG. 3 where L1 is the maximum length of the opening 177 in the X direction and L2 is a length of the straight line segment 171b, one of the connections 178 is a part of the opening 177 existing in the belt-shaped area which is parallel to the Y axis and has a width of (L1−L2)/4 as measured to the left from the left end 171b' of the straight line segment 171b.

Similarly, in FIG. 3, another connection 178 is a part of the opening 177 existing in the belt-shaped area which is parallel to the Y axis and has a width of (L1−L2)/4 as measured to left from the left end 172b' of the straight line segment 172b.

Similarly, in FIG. 3, there is still another connection 178 which is a part of the opening 177 existing in the belt-shaped area which is parallel to the Y axis and has a width of (L1−L2)/4 as measured to the right from the right end 171b" of the straight line segment 171b.

Similarly, in FIG. 3, there is still another connection 178 which is a part of the opening 177 existing in the belt-shaped area which is parallel to the Y axis and has a width of (L1−L2)/4 as measured to the right from the right end 172b" of the straight line segment 172b.

Since such parts of the opening 177 as described above are contiguous to the inclined planes 171 and 172, the parts are likely to suffer concentrated stress peculiar to the inclined plane. In the present invention, such nature of the aforementioned parts, i.e. the connections 178, is identified, and the present invention is based on a finding that the delamination can be more surely suppressed at least when the minimum radius of curvature at the connections 178 is within a specific range.

The concavity 170 has a shape where the cross-sectional area gradually changes as in a part of quadrangular pyramid. Therefore, the opening 175 which is an open end of the concavity 170 has an area larger than that of the opening 177, and the opening 175 has a shape approximately analogous to the opening 177 or a shape analogous to a compressed or extended version of a part of the opening 177. Therefore, the shape of the opening 175 of the concavity 170 shown in FIG. 2 in a plan view is an oval shape formed by consisting of the inclined plane top ends 171a and 172a which are straight line segments corresponding to the inclined planes 171 and 172 respectively and the upright plane top ends 173a and 174a which are arcs corresponding to the upright planes 173 and 174 respectively. Therefore, also in the case of the opening 175, the connection 176 between the inclined plane top end 171a or 172a and the upright plane top end 173a or 174a is preferably curved. According to this, the effect described above becomes more remarkable. That is, the generation of stress accompanying structural change, thermal change and the like occurring around the concavity 170 is unlikely to be concentrated at the connection 176. As a result, the occurrences of cracks originating from the connection 176 and delamination around the connection 176 can be suppressed. Thus, the optical waveguide 1 enables high-quality optical communication while suppressing degradation of the transmission efficiency through the optical waveguide 1 and the reflection efficiency on the inclined surface 171.

The minimum radius of curvature $r_1$ of the connection 176 (FIG. 4) is not particularly limited, but is preferably 1 to 500 μm, more preferably 3 to 400 μm, even more preferably 5 to 350 μm, further more preferably 10 to 100 μm, most preferably 20 to 40 μm. When the minimum radius of curvature $r_1$ of the connection 176 is within the aforementioned range, the stress concentration specifically at the connection 176 can be alleviated and problems accompanying the stress concentration can be suppressed.

The connection 176 is a part of the opening 175 in FIG. 4 which is located, for example, between the inclined plane top end 171a corresponding to the inclined plane 171 and upright plane top end 173a corresponding to the upright plane 173. Specifically, as explained referring to FIG. 4 wherein L3 is a maximum length of the opening 175 in the X direction and L4 is a length of the straight line segment 171a, the connection 176 is a part of the opening 175 existing in the belt-shaped area which is parallel to the Y axis and has a width of (L3−L4)/4 as measured to the left from the left end 171a' of the inclined plane top end 171a.

Similarly, in FIG. 4, another connection 176 is a part of the opening 175 existing in the belt-shaped area which is parallel to the Y axis and has a width of (L3−L4)/4 as measured to the left from the left end 172a' of the inclined plane top end 172a.

Similarly, in FIG. 4, there is still another connection 176 which is a part of the opening 175 existing in the belt-shaped area which is parallel to the Y axis and has a width of (L3−L4)/4 as measured to the right from the right end 171a" of the inclined plane top end 171a.

Similarly, in FIG. 4, there is still another connection 176 which is a part of the opening 175 existing in the belt-shaped area which is parallel to the Y axis and has a width of (L3−L4)/4 as measured to the right from the right end 172a" of the incline plane top end 172a.

Not only at the aforementioned openings 175 and 177, but also at, for example, each of opening of the concavity 170 in the interfacial plane between the clad layer 12 and the core layer 13, and the bottom of the concavity 170, the minimum radius of curvature of the connection between the straight line segment corresponding to the inclined plane 171 and the arcs corresponding to the upright plane 173 is preferably 1 to 500 μm, more preferably 3 to 400 μm, even more preferably 5 to 350 μm, further more preferably 10 to 100 μm, most preferably 20 to 40 μm. When the minimum radius of curvature is within the range described above, troubles accompanying the stress concentration can be more surely suppressed.

In the opening 177, the minimum radius curvature may not necessarily be within the aforementioned range at portions other than the connections 178, but is preferred to be within in the range at all portions of the opening (including the bottom) including the line segments corresponding to the inclined planes and the arcs corresponding to the upright planes. When the minimum radius of curvature is within the range described above, troubles accompanying the stress concentration can be more surely suppressed.

The shape of the concavity 170 is not necessarily limited, but is preferably an approximate quadrangular pyramid. When the shape of the concavity 170 is not an approximate quadrangular pyramid, the shapes of openings 177 and 175 are different from each another.

When the overall shapes of the openings 177 and 175 are oval as described above, the aforementioned effect becomes more remarkable. That is, by virtue of the oval shape of the openings 177 and 175, even if the optical waveguide sustains an external force expanding or contracting the waveguide in the longitudinal direction thereof, especially the stress concentration to the connection 176 can be alleviated by such shape of the openings 177 and 175. Therefore, by designing the connections 178 and 176 to be a curved shape as described above and designing the openings 177 and 175 to be an oval shape, especially troubles accompanying the stress concentration can be suppressed. The "oval" shape in the present specification means a circle partially including a straight line segment(s).

The overall shape of the opening 175 is not limited to an oval shape, and parts excluding the inclined plane top end 171a can be of any shape, for example, a polygonal shape such as tetragon, pentagon, or hexagon. The same applies to the opening 177. The same applies to the opening 177.

As the inclined plane 171 functions as a mirror, the inclination angle thereof is appropriately set in accordance with the converting direction of path of light from the core portion 14. When the lower surface of the core layer 13 is defined as a datum plane, the angle formed between the datum plane and the inclined plane 171 (acute angle) is preferably 30 to 60°, and more preferably 40 to 50°. When the inclination angle is within the range described above, the direction of path of light from the core portion 14 can be converted efficiently at the inclined plane 171, while suppressing the loss of light accompanying the light path conversion.

The angle formed between the datum plane and the inclined plane 172 (acute angle) is not particularly limited, but is preferably 20 to 90°, more preferably 30 to 60°, and even more preferably 40 to 50°, most preferably the same angle as the inclination angle of the inclined plane 171. When the angle is within the range described above, the stress generated around the concavity 170 is unlikely to be biasedly distributed, so that especially troubles accompanying the stress concentration can be suppressed. Each of the angles formed between the datum plane and the inclined planes 171 and 172 (acute angle) means an angle measured at a side opposite to the concavity 170 of the angles formed between the datum plane and the inclined planes 171 and 172.

In the first embodiment, the upright planes 173 and 174 orthogonally intersect with the interfacial plane between the core layer 13 and the clad layer 11. However, each of the angles formed between the datum plane and the upright planes 173 and 174 (acute angles) is not limited to that in this first embodiment, and is preferably 60 to 90°, more preferably 70 to 90°, and even more preferably 80 to 90°. When the angles formed between the datum plane and the upright planes 173 and 174 (acute angles) are within the range described above, the stress sustained by the interfacial plane between the clad layer 11 and the core layer 13 can be suppressed. In each of the drawings, each of the angles formed between the datum plane and the upright planes 173 and 174 is shown as being substantially 90°. The angles formed between the datum plane and the inclined planes 173 and 174 (acute angle) are measured at a side opposite to the concavity 170.

With the concavity 170 as described above, the width thereof can be suppressed to a required minimum level, whereby the interval between the concavities 170 can be reduced to the minimum when a plurality of the concavities are formed side-by-side. Therefore, the angles formed between the datum plane and the upright planes 173 and 174 (acute angles) that are rendered to fall within the range described above are advantageous in that the concavities 170 can be arranged with high density even if the core portions 14 are arranged with a narrow pitch. When the angles formed between the datum plane and the upright planes 173 and 174 (acute angles) are rendered to fall within the range described above, especially the stress concentration caused by the difference in physical properties of materials of the layers is suppressed around the upright planes 173 and 174, thereby reducing the probability of occurrence of delamination, which results in the remarkable improvement of the reliability of the optical waveguide 1.

The shapes of the upright planes 173 and 174 in the openings 177 or and 175, i.e., the arcs 173*b* and 174*b* and the upright plane top ends 173*a* and 174*a* described above, are curved as a whole. The upright planes 173 and 174 with such a shape can remarkably alleviate the stress concentration. This, coupled with the above-described curbed shape of the connection 178 of the opening 177 or the connection 176 of the opening 175, enables to surely suppress troubles occurring around the concavity 170.

The maximum depth of the concavity 170 is set appropriately in accordance with the thickness of the laminated body 10 and is not particularly limited, but is preferably 1 to 500 μm, more preferably 5 to 400 μm from the viewpoint of mechanical strength and flexibility of the optical waveguide 1.

The maximum length of the concavity 170, i.e., the maximum length of the concavity 170 in the Y direction in FIG. 2, is not particularly limited, but is preferably 2 to 1,200 μm, more preferably 10 to 1,000 μm in view of the relationship with the thickness of the clad layers 11 and 12, the thickness of the core layer 13 and the inclination angle of the inclined plane 171.

The maximum width of the concavity 170, i.e., the maximum length of the concavity 170 in the X direction in FIG. 2, is not particularly limited and set appropriately in accordance with the width of the core portion 14, etc., but is preferably 1 to 600 μm, more preferably 5 to 500 μm.

Regarding the concavity 170, one concavity 170 may be formed in correspondence with one core portion 14, or one concavity 170 may extend through a plurality of the core portions 14.

When a plurality of the concavities 170 is formed, they may be formed at the same position or different positions in the Y direction.

Examples of materials (main components) for forming the core layer 13 and the clad layers 11 and 12 include various resin materials, for example, acrylic resins, methacrylic resins, polycarbonates, polystyrenes, cyclic ether resins such as epoxy resins and oxetane resins, polyamides, polyimides, polybenzoxazoles, polysilanes, polysilazanes, silicone resins, fluororesins, polyurethane, polyolefin resins, polybutadiene, polyisoprene, polychloroprene, polyester resins such as polyethylene terephthalate (PET) and polybuthylene terephthalate (PBT), polyethylene succinate, polysulfone, polyether, cyclic olefin resins such as benzocyclobutene resins and norbornene resins. The resin material may be a composite material including a combination of resins of different compositions. These materials can be relatively easily processed; therefore, these materials are suitable as the materials for forming the core layer 13 and the clad layers 11 and 12.

Second Embodiment

Second, the second embodiment of the optical waveguide of the present invention is described as follows.

Figure 5:
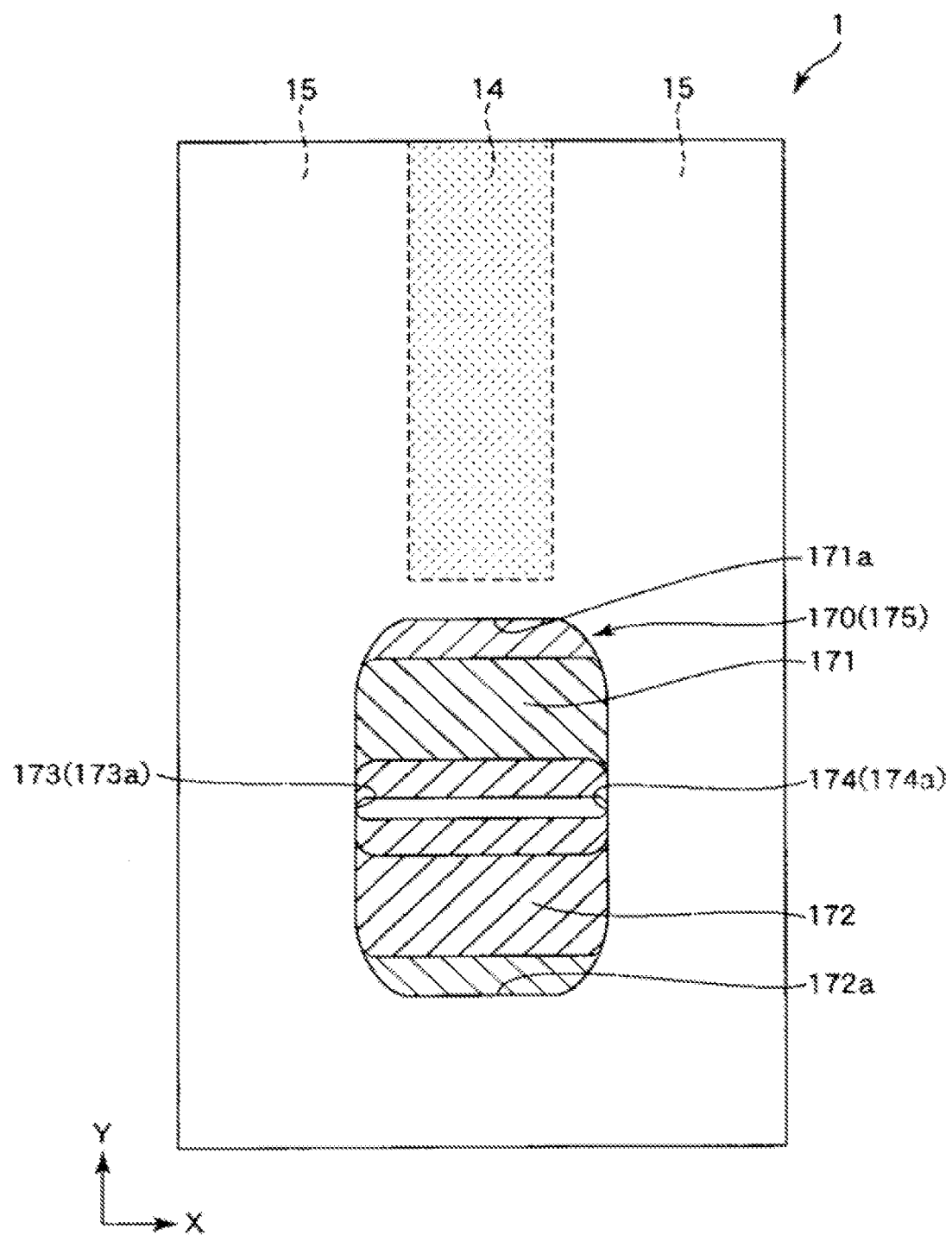
FIG. 5 is a plan view of the optical waveguide according to the second embodiment.

FIG. 5 is a plan view of the optical waveguide according to the second embodiment.

Hereinbelow, explanations are made on the second embodiment, but the explanations focus on the features different from the first embodiment while the explanations on the features shared with the first embodiment are omitted.

The optical waveguide 1 according to the second embodiment shown in FIG. 5 is same as the optical waveguide 1 according to the first embodiment except for the position of the concavity 170.

That is, the concavity 170 shown in FIG. 5 is located at a position extended from the core portion 14 and in the side clad portion 15. Such a concavity 170 is formed by processing the clad layer 12, the side clad portion 15, and the clad layer 11, each of which is made of a clad material. Therefore, for processing parts, the conditions such as a processing rate become almost the same. As a result, the processing can be performed with high precision; therefore the dimensional precision of the formed concavity 170 can be remarkably improved. Therefore, according to the second embodiment, it is possible to provide the optical waveguide 1 which is provided with the concavity 170 with high dimensional precision, and which exhibits high reflection efficiency on the inclined surface 171 and enables high-quality optical communication.

Even in this second embodiment, the same effect as in the first embodiment can be obtained.

Third Embodiment

Next, explanations are made below on the third embodiment of the optical waveguide of the present invention.

Figure 6:
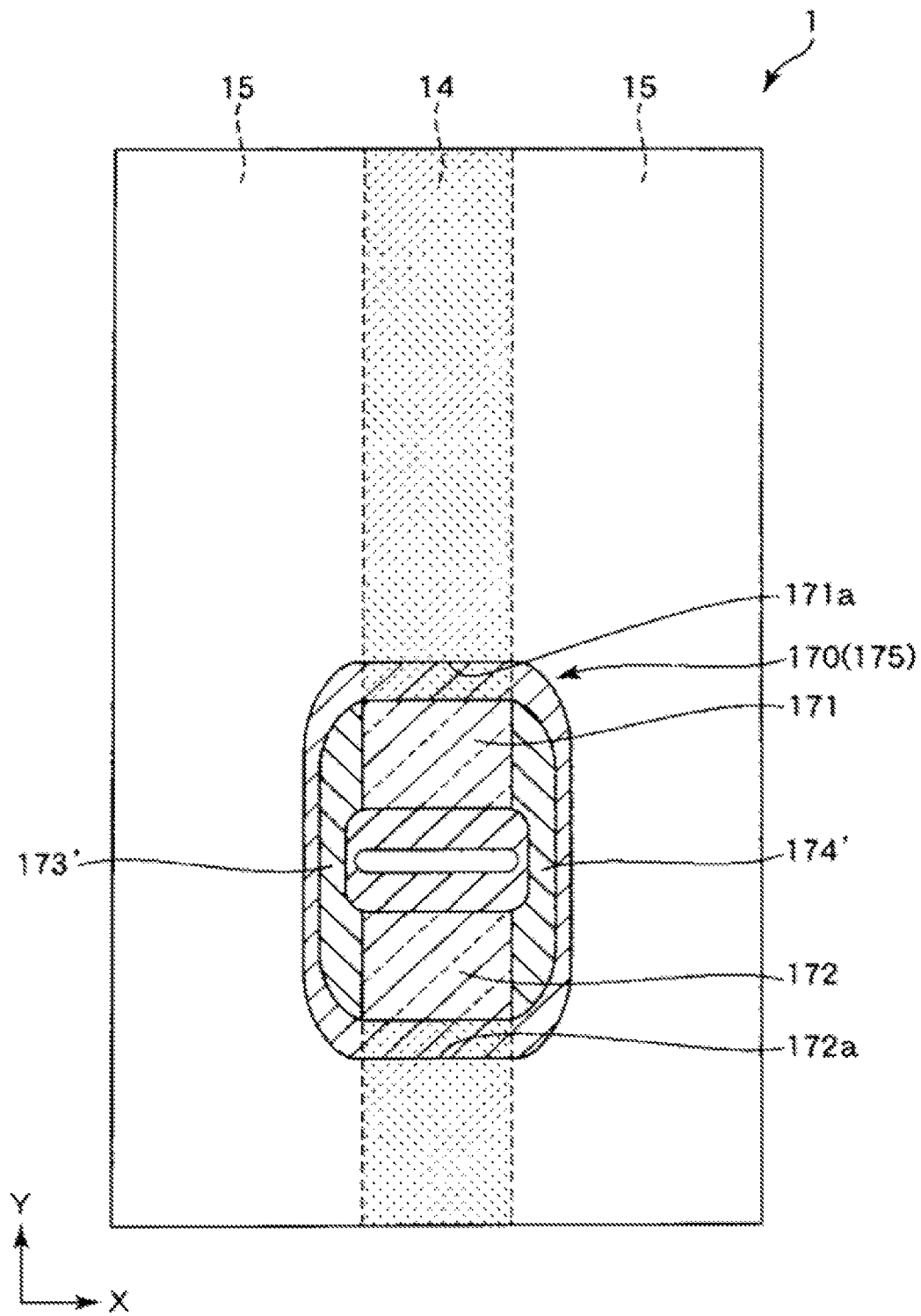
FIG. 6 is a plan view of the optical waveguide according to the third embodiment.

FIG. 6 is a plan view of the optical waveguide according to the third embodiment.

Hereinbelow, explanations are made on the third embodiment, but the explanations focus on the features different from the first embodiment while the explanations on the features shared with the first embodiment are omitted.

In the first embodiment as described above, the upright planes 173 and 174 orthogonally intersect the interfacial plane between the core layer 13 and the clad layer 11, whereas in the third embodiment, the upright planes 173 and 174 are inclined relative to and intersect with the interfacial plane. The optical waveguide 1 according to the third embodiment is same as the optical waveguide 1 according to the first embodiment except for this point.

The inner wall surface of such a concavity 170 is formed by four inclined planes. That is, the inner wall surface of the concavity 170 is configured as a whole to form acute angles with the datum plane (at a side opposite to the concavity 170). Such a concavity 170 has a "motar"-like shape, which, therefore, can be formed relatively easily. Therefore, the inclined plane 171 with high dimensional precision (precision of the inclination angle and inclined plane) can be formed relatively easily.

In the third embodiment, the same effect as in the first embodiment can be obtained.

Fourth Embodiment

Next, the third embodiment of the optical waveguide of the present invention is described as follows.

Figure 7:
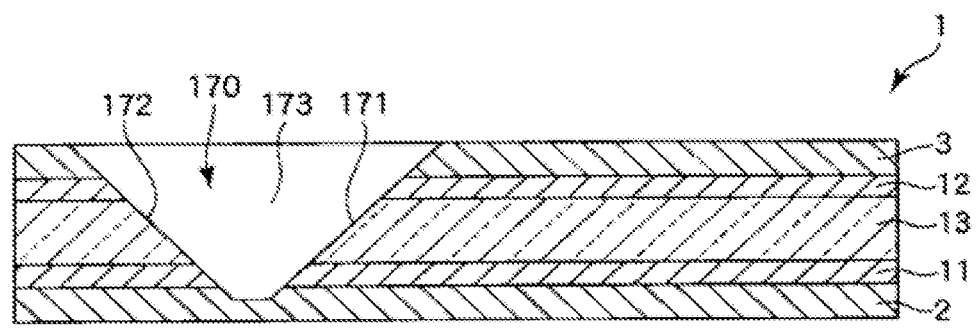
FIG. 7 is a cross sectional view of the optical waveguide according to the fourth embodiment.

FIG. 7 is a cross sectional view of the optical waveguide according to the fourth embodiment.

Hereinbelow, explanations are made on the fourth embodiment, but the explanations focus on the features different from the fourth embodiment while the explanations on the features shared with the first embodiment are omitted.

The optical waveguide 1 according to the fourth embodiment shown in FIG. 7 is same as the optical waveguide 1 according to the first embodiment except that the fourth embodiment further includes a support film 2 laminated on the lower surface of the clad layer 11, and a cover film 3 laminated on the upper surface of the clad layer 12.

The concavity 170 is formed so as to penetrate the cover film 3. Therefore, the inclined plane 171 is a flat plane continuously formed from the cover film 3, penetrating through the clad layer 12 and the core layer 13, and extending to a middle portion of the clad layer 11.

In the fourth embodiment, the same effect as in the first embodiment can be obtained.

In the fourth embodiment, the inclined plane 171 has a larger area since the inclined plane 171 includes the (cut) surface of the cover film 3 as well. Therefore, the inclined plane 171 can be easily formed with higher precision. That is, if as the area of plane being to be processed is larger increases, the processing accuracy precision of the cross section cut surface of the core portion 14 can be easily improved, therefore, the reflection efficiency of the mirror is specifically can be markedly improved in the fourth embodiment.

Regarding not only the openings 175 and 177, the opening of the concavity in the interfacial plane between the clad layer 12 and the core layer 13, and the bottom of the concavity 170, but the opening of the concavity 170 in the interfacial plane between the cover film 3 and the clad layer 12 and the interfacial plane between the clad layer 11 and the support film 2, the minimum radius of curvature of the connections between the straight line segments corresponding to the inclined plane 171 and the arcs corresponding to the upright plane 173 is preferably 1 to 500 μm, more preferably 3 to 400 μm, even more preferably 5 to 350 μm, further more preferably 10 to 100 μm, most preferably 20 to 40 μm. When the minimum radius of curvature is within the range described above, troubles accompanying the stress concentration can be more surely suppressed.

<Producing Method of Optical Waveguide>

Next, explanations are made below on the method for producing the optical waveguide of the present invention.

The optical waveguide 1 shown in FIG. 1 can be produced by a method including a step of laminating a clad layer 11, a core layer 13 and a clad layer 12 in this order to obtain a laminated body 10, and a step of performing a processing to remove a part of the laminated body 10 to form the concavity 170.

Hereinbelow, each of the steps is explained.

[1] First, a core layer-forming layer or a multilayered structure including a core layer-forming layer is obtained by a method such as (a) a method in which respective raw material compositions for the clad layer 11, the core layer 13, and the clad layer 12 are sequentially formed into films in this order, (b) a method in which the clad layer 11, the core layer 13 and the clad layer 12 are formed from their respective raw material compositions, followed by laminating the formed layers, or (c) a method in which the three kinds of raw material compositions described above are simultaneously extrusion-molded to obtain a laminated body.

When forming the layers, the core layer 13 having the core portions 14 formed in a desired pattern can be obtained simply by using a raw material composition for forming the core layer 13, which has a refractive index modulation function that allows the refractive index to change by exposure to light, and exposing the core layer-forming layer to light.

The method for forming the core layer 13 producing method is not limited to those mentioned above, and the core layer 13 can also be formed by, for example, the a method of repeatedly performing the a film-forming step and the a patterning step including a combination of photo lithography and etching, and thereby obtaining the core layer 13 having the core portions 14 formed in a as desired pattern can be obtained.

[2] Then, a process to remove a part of the laminated body 10 is performed. By this process, the concavity 170 is formed and the optical waveguide 1 can be obtained. There are various methods of forming the concavity 170. Examples of such method include laser processing, electron beam processing, and imprinting method as well as mechanical processing techniques such as cut processing and grinding processing. By using the laser machining, the concavity 170 with the high dimensional precision can be relatively easily formed. The method for forming the concavity 170 is explained below taking the laser processing as a representative example.

Figure 8:
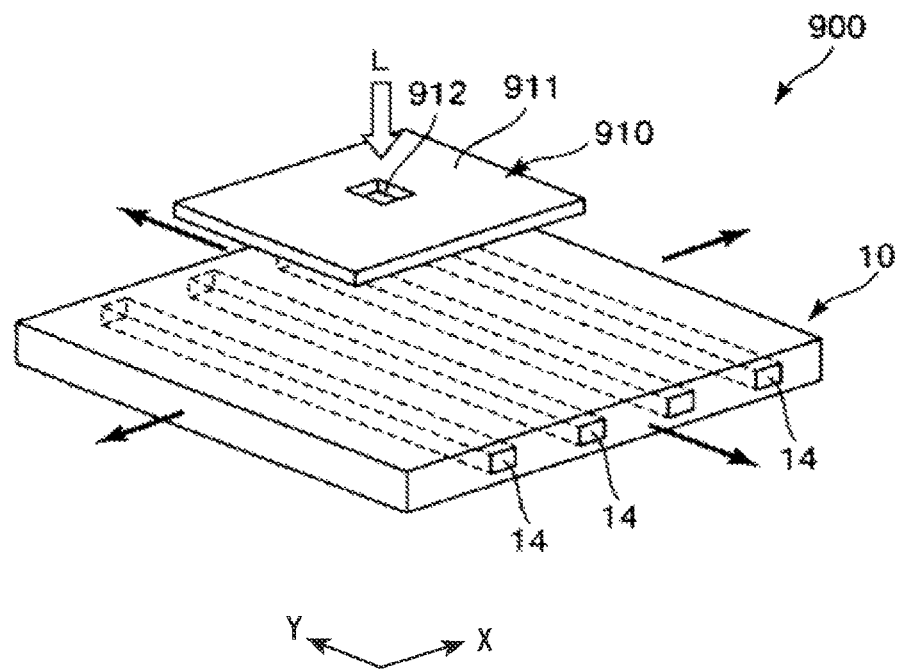
FIG. 8 is a perspective view of one example of a laser processor used for producing the optical waveguide of the present invention.
Figure 9:
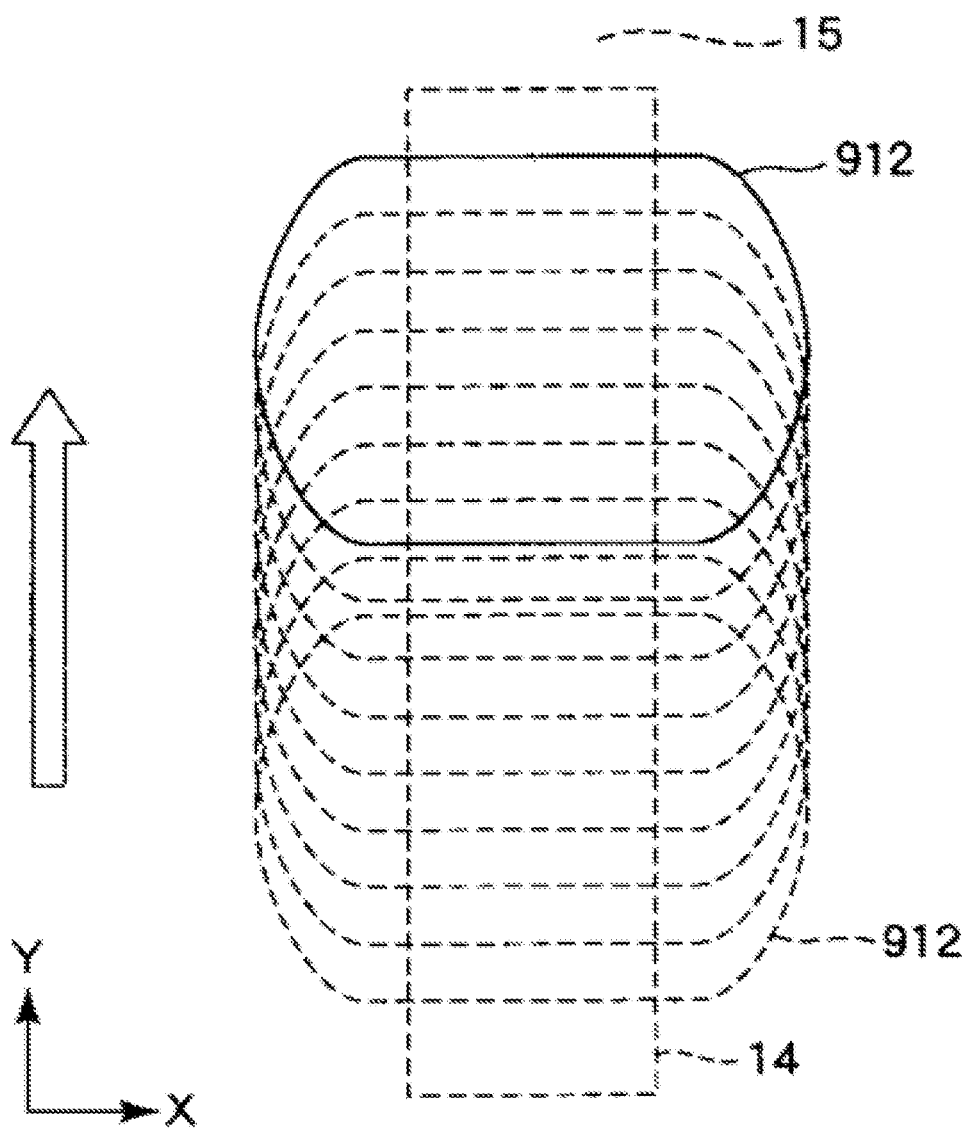
FIG. 9 is a plan view showing the procedure of forming the concavity (hollow section) by moving the mask of laser processor relatively to the subject being processed.

FIG. 8 is a perspective view of one example of a laser processor used for producing the optical waveguide of the present invention, and FIG. 9 is a plan view showing the procedure of forming the concavity (hollow section) by moving the mask of laser processor relatively to the subject being processed.

The laser processor (laser processing device) 900 shown in FIG. 8 comprises a laser light source (not shown), a mask 910 for laser processing positioned on the laser light axis, a drive stage (not shown) which moves the laminated body 10 relatively to the mask 910 for laser processing. The constructions of the parts of the laser processor 900 are described in detail below.

The laser light source can be appropriately selected in accordance with the wavelength of the laser oscillated, and for example, may be a solid laser such as a YAG laser, a YVO$_4$ laser, a Yb laser, and a semiconductor laser, or a gas laser such as a CO$_2$ laser, a He—Ne laser, and an excimer laser.

The wavelength of the laser can be appropriately set in view of the materials constituting the laminated body 10, and may be, for example, 150 to 950 nm.

The drive stage may be, for example, an X-Y stage and a linear actuator. By moving the laminated body 10 on the drive stage relatively to the mask 910 for laser processing, the region of laser irradiation to the laminated body 10 can be scanned with an arbitrary pattern. Thus, the laser irradiation can be performed for an arbitrary period of time with respect to an arbitrary position of the laminated body 10.

Upon irradiation with the laser, a vaporization of the laminated body 10 occurs at the irradiated region and the concavity is formed. Accordingly, by scanning the irradiation region, the concavity is continuously formed along the scanning track, and finally the concavity having the opening corresponding to the scanning track is formed.

Alternatively, instead of moving the laminated body 10 relatively to the fixed mask 910 for laser processing, the mask 910 for laser processing may be moved relatively to the fixed laminated body 10, or both of the laminated body 10 and the mask 910 for laser processing may be moved.

The mask 910 for laser processing has a plate shape and is provided with a shielding part 911 which shields the laser and the transmission part 912 which transmits the laser therethrough. When the laser is irradiated through the mask 910 for the laser processing, the laser irradiation region is formed at the transmission part 912 such that the laser is selectively irradiated to the region on the laminated body 10 corresponding to the shape of the transmission part 912 in a plan view.

Next, the method for forming the concavity 170 in the laminated body 10 by using such a mask 910 for laser processing as mentioned above is explained.

The mask 910 for laser processing is used in a manner such that the transmission part 912 thereof relatively moves in the longitudinal direction of the core portion 14, i.e., Y direction, to the laminated body 10, while irradiating the laminated body 10 with the laser. FIG. 9 shows the intermittent positions of the transmission part 912 during the movement described above.

When the transmission part 912 (the irradiation region of the laser) moves along the track shown in FIG. 9, the concavity 170 with the opening 175 shown in FIG. 4 is formed in correspondence with the track of the irradiation region. Thus, the concavity 170 with the opening 175 which is oval in a plan view can be formed easily.

Further, the movement of the transmission part 912 (the irradiation region of the laser) along the track shown in FIG. 9 results in a position-dependent distribution of cumulative amount of light is formed, wherein the cumulative amount of light gradually decreases toward the end of the concavity 170 in the Y direction, i.e., from the starting end to the finishing end between which the transmission part 912 is moved. Accordingly, at the upper end and the lower end of the track shown in FIG. 9, the inclined planes 171 and 172 as shown in FIG. 1 are formed respectively. By appropriately changing the moving speed of the transmission part 912, the inclination angle of the inclined planes 171 and 172 can be adjusted.

When the minimum radius curvature of the part of transmission part 912 corresponding to the connection 178 of the opening 177 is 1 to 500 μm, this range of minimum radius curvature can also be satisfied by the connection 178. That is, by using the mask 910 for laser processing, the concavity 170 as described above can formed efficiently.

<Electronic Device>

The optical waveguide according to the present invention as described above exhibits high efficiency of transmission of light and high optical coupling efficiency when coupled with other optical components. Therefore, the use of the optical waveguide of the present invention enables to obtain a reliable electronic device (i.e., the device of the present invention) capable of high-quality optical communication.

The electronic device provided with the optical waveguide of the present invention may be, for example, an electronic device such as a mobile phone, a game machine, a router apparatus, a WDM device, a personal computer, a television, or a home server. Any of these electronic devices need to transmit large-volume data at high speed with, for example, an arithmetic device such as an LSI and a storage device such as a RAM. Accordingly, being provided with the optical waveguide of the present invention, the electronic device as described above can prevent noise peculiar to electric wiring and troubles such as signal deterioration whereby the performance thereof can be improved, and therefore can contribute to the reduction of cost associated with the electronic device.

Furthermore, at the optical waveguide incorporated in the electronic device, heat generation can be greatly reduced as compared to the case of electric wiring. Therefore, the electric power to be consumed for cooling can be reduced, thereby enabling to reduce the electricity consumption of the electronic device as a whole.

The optical waveguide and the electronic device of the present invention are described hereinabove, which, however, should not be construed as limiting the present invention, and for example, the optical waveguide of the present invention may optionally contain any additional component.

When the inclined plane is used as a mirror on the light incidence side, the light emitting side may be designed so as to emit light from the end of the core portion 14 along the optical axis of the core portion 14, and the light emitting end may be provided with a connector. On the other hand, when the inclined plane is used as a mirror on the light emitting side, the light incidence side may be designed so as to receive light from the end of the core portion 14 along the optical axis of the core portion 14, and the light incidence end may be provided with a connector.

In the optical waveguide, a plurality of concavities may be formed. For example, when two concavities are formed, the inclined plane of one of the concavity can be used as the mirror on the light incidence side, and the inclined plane of another concavity can be used as the mirror on the light emitting side.

Figure 10:
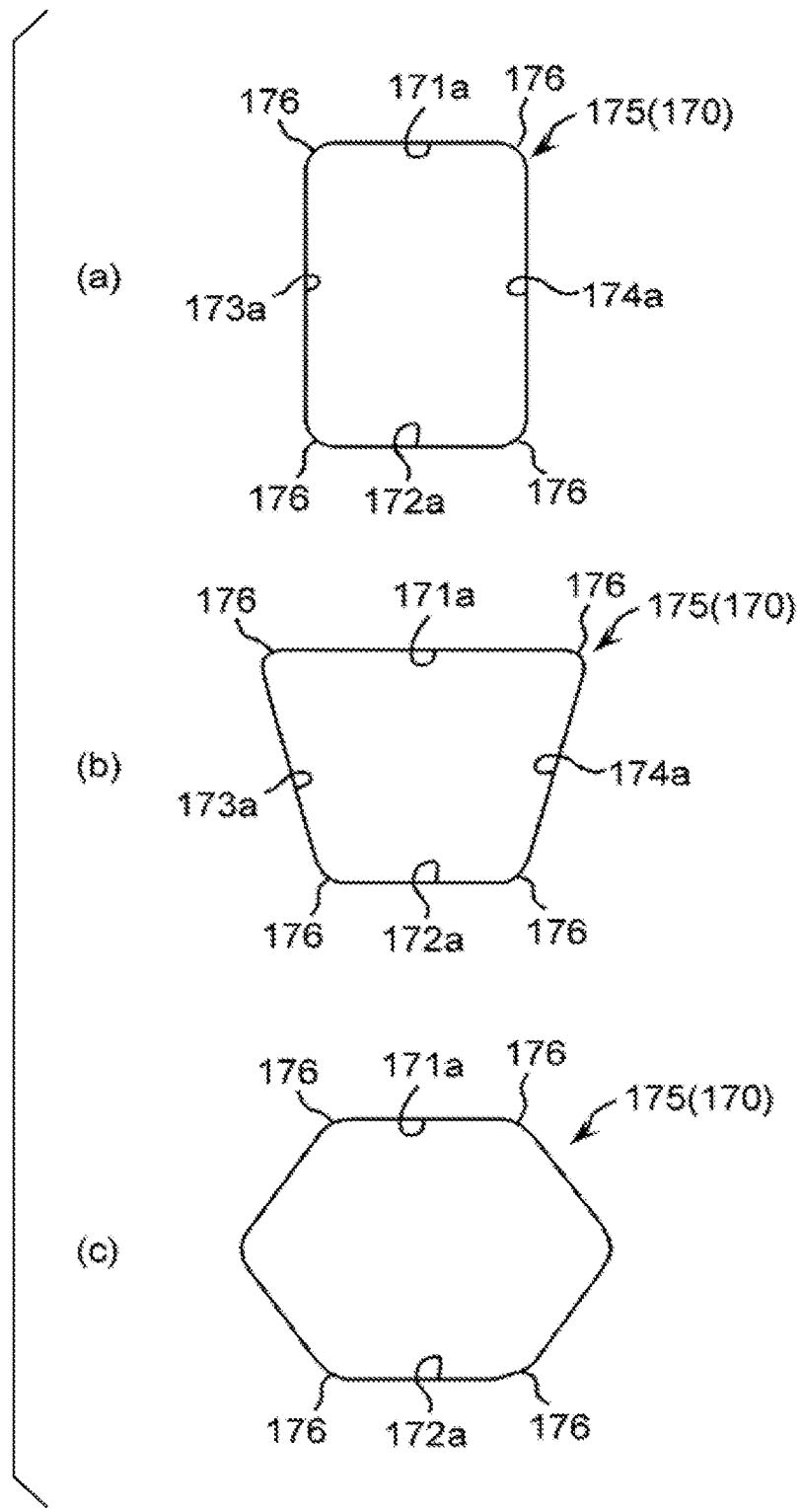
FIG. 10 is a schematic plan view of another example of the opening in the concavity (hollow section) of FIG. 4.

The opening of the concavity in a plan view may have a shape as shown in FIG. 10. FIG. 10 is a schematic plan view of another example of the opening in the concavity of FIG. 4.

The opening 175 of the concavity 170 shown in FIG. 10(*a*) is approximately rectangular. The opening 175 of the concavity 170 shown in FIG. 10(*b*) is approximately trapezoidal. The opening 175 of the concavity 170 shown in FIG. 10(*c*) is approximately hexagonal. Such a connection 176 between the top end of the incline plane 171 (the inclined plane top end 171*a*) and the top end of the upright plane 173 (the upright plane top end 173*a*) is curved as described above. The optical waveguide provided with such a concavity as having any of the shapes described above can bring about the same effects as in the case of the embodiments described above.

The present embodiments and the present production method encompass the following technical concept.

(1) An optical waveguide comprising a core layer having a core portion; a first clad layer formed on one surface of the core layer; a second clad layer formed on another surface of the core layer; and a hollow section penetrating through the second clad layer and the core layer, and extending to a middle portion of the first clad layer,
  wherein a part of an inner wall surface at the hollow section is configured as an inclined plane which is inclined relative to and intersects with a plane including an interfacial plane between the core layer and the first clad layer, and
  a minimum radius of curvature at a connection between the inclined plane and other parts of the inner wall surface continuously extending from the inclined plane is 1 to 500 µm as measured at the plane including the interfacial plane.

(2) The optical waveguide according to (1), wherein: the hollow section is formed at the core portion or at a middle region of the core portion or a position extended from the core portion, and
  the inclined plane traverses an optical axis of the core portion or a line extended therefrom.

(3) The optical waveguide according to (1) or (2), wherein a minimum radius of curvature at a connection between the inclined plane and other parts of the inner wall surface continuously extending from the inclined plane is 1 to 500 µm as measured at a position of the hollow section corresponding to a surface of the second clad layer which is opposite to the core layer and a position of the hollow section corresponding to the interfacial plane between the second clad layer and the core layer.

(4) The optical waveguide according to any one of (1) to (3), further comprising a cover layer laminated with the second clad layer on its side opposite to the core layer,
  wherein the concavity is formed as penetrating the cover layer.

(5) The optical waveguide according to any one of (1) to (4), wherein the inner wall surface at the hollow section includes an upright plane which approximately vertically intersects with the plane including the interfacial plane.

(6) The optical waveguide according to (5), wherein the inner wall surface at the hollow section includes a pair of said inclined planes and a pair of said upright planes,
  and the hollow section being configured such that the inclined planes are positioned opposite to each other and the upright planes are positioned opposite to each other as viewed with respect to a cross section of the hollow section at the plane including the interfacial plane.

(7) The optical waveguide according to (5) or (6), wherein the upright plane at the cross section of the hollow section is curved as a whole.

(8) The optical waveguide according to any one of (1) to (4), wherein the inner wall surface at the hollow section as a whole forms an acute angle with the plane including the interfacial plane as measured at a side opposite to the hollow section.

(9) An electronic device comprising the optical waveguide according to any one of (1) to (8).

EXAMPLES

Next, the specific examples of the present invention are described as follows.

1. Production of Optical Waveguide Having Concavity

Example 1-1

(1) Production of Resin Composition for Forming Clad Layer 20 g of "CELLOXIDE 2081" which is an alicyclic epoxy resin produced by Daicel Chemical Industries, Co., Ltd. and 0.6 g of "ADEKA OPTOMER SP-170" which is a cationic polymerization initiator produced by ADEKA Co., Ltd. and 80 g of methyl isobutyl ketone were mixed and stirred, thereby obtaining a solution.

Next, the obtained solution was filtered through a PTFE filter with a pore size of 0.2 µm, thereby obtaining a clear, colorless transparent resin composition for forming clad layer.

(2) Production of Photosensitive Resin Composition 20 g of "YP-50S" produced by Nippon Steel Chemical Co., Ltd. as an epoxy polymer, 5 g of "CELLOXIDE 2021P" produced by Daicel Chemical Industries, Co., Ltd. as a photopolymerizable monomer, and 0.2 g of "ADEKA OPTOMER SP-170" produced by ADEKA Co., Ltd. as a polymerization initiator were added to 80 g of methyl isobutyl ketone, followed by stirring to dissolve the solid components, thereby obtaining a solution.

Next, the obtained solution was filtered through a PTFE filter with a pore size of 0.2 µm, thereby obtaining a clear, colorless transparent photosensitive resin composition.

(3) Formation of the Lower Clad Layer

A polyimide film was uniformity coated with the resin composition for forming clad layer by a doctor blade, and thereafter, the coated film was left in a dry chamber at 50° C. for ten minutes. After completely removing the solvent, ultraviolet light was irradiated to the whole of the coated film using a UV exposure machine, thereby curing the coated resin composition. Thus, a colorless transparent lower clad layer with a thickness of 10 µm was obtained. The accumulation amount of the ultraviolet radiation was 500 mJ/cm$^2$.

(4) Formation of Core Layer

The obtained lower clad layer was uniformly coated with the photosensitive resin composition by a doctor blade, and thereafter, the coated film was left in a dry chamber at 40° C. for five minutes. After completely removing the solvent, ultraviolet light was irradiated to the coated film using a maskless exposure machine so as to draw a straight line pattern where line and space are alternately repeated. The width of the core portion was set at 50 µm, and the distance between the core portions P was set at 250 µm. The distance between the core portions P is the distance between the centerlines of the core portions. The centerline of the core portion is a straight line parallel to the longitudinal direction of the core portion and extends along the center of the core portion. The cumulative amount of the ultraviolet light was 1000 mJ/cm$^2$.

Then, the coated film after irradiation was left in an oven at 150° C. for 30 minutes. After that, a clear pattern of waveguide was confirmed. The thickness of the obtained core layer was 50 µm.

(5) Formation of Top Clad Layer

The resin composition for forming clad layer was coated on the obtained core layer in the same manner as in (3), thereby obtaining a transparent upper clad layer with a thickness of 10 μm.

(6) Formation of Concavity

Next, two concavities were formed with a 10 cm interval in the core portion by the laser processing, and one of the concavities was set as a mirror on the light emitting side, another concavity was set as a mirror on the light incidence side. The concavity was formed similarly with respect to all the core portions. The shape and dimension of the formed concavity were as described below. The concavity was formed so that the opening 175 which is an open end thereof and the opening 177 along the interfacial plane between the core layer 13 and the clad layer 11 have approximately analogous shape.

<Shape and Dimension of Concavity>
- schematic view of the opening 175: FIG. 4
- minimum radius of curvature of the connection 178 $r_2$: 5 μm
- shape of edge of the opening 175: arc (radius of curvature of arc 125 μm)
- maximum length of the concavity 170 in Y direction: 210 μm
- maximum length of the concavity 170 in X direction: 105 μm
- depth of the concavity 170: 65 μm Regarding the connection 176 of the opening 175, the connection of the opening of the concavity in the interfacial plane between the clad layer 12 and the core layer 13, and the connection of the bottom of the concavity 170, the minimum radius curvature thereof was 5 μm.

The connection is a part positioned between a part of the straight line segment corresponding to the inclined plane 171 and a part of the arc 173b corresponding to the upright plane 173.

Example 1-2

An optical waveguide was obtained in the same manner as in Example 1-1 except that the shape of the mask for laser processing was changed so as to change the shape and dimension of the concavity as shown below.

<Shape and Dimension of Concavity>
- schematic view of the opening 175: FIG. 4
- minimum radius of curvature of the connection 178 $r_2$: 20 μm
- shape of edge of the opening 175: arc (radius of curvature of arc: 66.25 μm)
- maximum length of the concavity 170 in Y direction: 210 μm
- maximum length of the concavity 170 in X direction: 115 μm
- depth of the concavity 170: 65 μm Regarding the connection 176 of the opening 175, the connection of the opening of the concavity 170 in the interfacial plane between the clad layer 12 and the core layer 13, and the connection of the bottom of the concavity 170, the minimum radius curvature thereof was 20 μm.

Example 1-3

An optical waveguide was obtained in the same manner as in Example 1-1 except that the shape of the mask for laser processing was changed so as to change the shape and dimension of the concavity as shown below.

<Shape and Dimension of Concavity>
- schematic view of the opening 175: FIG. 4
- minimum radius of curvature of the connection 178 $r_2$: 40 μm
- shape of edge of the opening 175: arc (radius of curvature of arc: 48.33 μm)
- maximum length of the concavity 170 in Y direction: 210 μm
- maximum length of the concavity 170 in X direction: 125 μm
- depth of the concavity 170: 65 μm Regarding the connection 176 of the opening 175, the connection of the opening of the concavity 170 in the interfacial plane between the clad layer 12 and the core layer 13, and the connection of the bottom of the concavity 170, the minimum radius curvature thereof was 40 μm.

Example 1-4

An optical waveguide was obtained in the same manner as in Example 1-1 except that the shape of the mask for laser processing was changed so as to change the shape and dimension of the concavity as shown below.

<Shape and Dimension of Concavity>
- schematic view of the opening 175: FIG. 4
- minimum radius of curvature of the connection 178 $r_2$: 1 μm
- shape of edge of the opening 175: arc (radius of curvature of arc: 6.33 μm)
- maximum length of the concavity 170 in Y direction: 210 μm
- maximum length of the concavity 170 in X direction: 105 μm
- depth of the concavity 170: 65 μm Regarding the connection 176 of the opening 175, the connection of the opening of the concavity in the interfacial plane between the clad layer 12 and the core layer 13, and the connection of the bottom of the concavity 170, the minimum radius curvature thereof was 1 μm.

Example 1-5

An optical waveguide was obtained in the same manner as in Example 1-1 except that the shape of the mask for laser processing was changed so as to change the shape and dimension of the concavity as shown below.

<Shape and Dimension of Concavity>
- schematic view of the opening 175: FIG. 4
- minimum radius of curvature of the connection 178 $r_2$: 100 μm
- shape of edge of the opening 175: arc (radius of curvature of arc: 120 μm) view
- maximum length of the concavity 170 in Y direction: 210 μm
- maximum length of the concavity 170 in X direction: 200 μm
- depth of the concavity 170: 65 μm Regarding the connection 176 of the opening 175, the connection of the opening of the concavity 170 in the interfacial plane between the clad layer 12 and the core layer 13, and the connection of the bottom of the concavity 170, the minimum radius curvature thereof was 100 μm.

Example 1-6

An optical waveguide was obtained in the same manner as in Example 1-1 except that the shape of the mask for laser processing was changed so as to change the shape of the concavity as shown below, and the distance P between the core portions was changed to 500 μm.
<Shape and Dimension of Concavity>
 schematic view of the opening 175: FIG. 4
 minimum radius of curvature of the connection 178 $r_2$: 300 μm
 shape of edge of the opening 175: arc (radius of curvature of arc: 340 μm)
 maximum length of the concavity 170 in Y direction: 210 μm
 maximum length of the concavity 170 in X direction: 640 μm
 depth of the concavity 170: 65 μm
Regarding the connection 176 of the opening 175, the connection of the opening of the concavity 170 in the interfacial plane between the clad layer 12 and the core layer 13, and the connection of the bottom of the concavity 170, the minimum radius curvature thereof was 300 μm.

Example 1-7

An optical waveguide was obtained in the same manner as in Example 1-1 except that the shape of the mask for laser processing was changed so as to change the shape of the concavity as shown below, and the distance P between the core portions was changed to 500 μm.
<Shape and Dimension of Concavity>
 schematic view of the opening 175: FIG. 4
 minimum radius of curvature of the connection 178 $r_2$: 450 μm
 shape of edge of the opening 175: arc (radius of curvature of arc: 580 μm)
 maximum length of the concavity 170 in Y direction: 210 μm
 maximum length of the concavity 170 in X direction: 900 μm
 depth of the concavity 170: 65 μm
Regarding the connection 176 of the opening 175, the connection of the opening of the concavity 170 in the interfacial plane between the clad layer 12 and the core layer 13, and the connection of the bottom of the concavity 170, the minimum radius curvature thereof was 450 μm.

Example 1-8

An optical waveguide was obtained in the same manner as in Example 1-1 except that the shape of the mask for laser processing was changed so as to change the shape and dimension of the concavity as shown below.
<Shape and Dimension of Concavity>
 schematic view of the opening 175: FIG. 4
 minimum radius of curvature of the connection 178 $r_2$: 100 μm
 shape of edge of the opening 175: arc (radius of curvature of arc: 120 μm) view
 maximum length of the concavity 170 in Y direction: 900 μm
 maximum length of the concavity 170 in X direction: 200 μm
 depth of the concavity 170: 65 μm
Regarding the connection 176 of the opening 175, the connection of the opening of the concavity 170 in the interfacial plane between the clad layer 12 and the core layer 13, and the connection of the bottom of the concavity 170, the minimum radius curvature thereof was 100 μm.

Example 2-1

An optical waveguide was obtained in the same manner as in Example 1-1 except that the shape of the mask for laser processing was changed so as to change the shape and dimension of the concavity as shown below.
<Shape and Dimension of Concavity>
 schematic view of the opening 175: FIG. 10(a)
 minimum radius of curvature of the connection 178 $r_2$: 5 μm
 maximum length of the concavity 170 in Y direction: 210 μm
 maximum length of the concavity 170 in X direction: 125 μm
 depth of the concavity 170: 65 μm
Regarding the connection 176 of the opening 175, the connection of the opening of the concavity in the interfacial plane between the clad layer 12 and the core layer 13, and the connection of the bottom of the concavity 170, the minimum radius curvature thereof was 5 μm.

Example 2-2

An optical waveguide was obtained in the same manner as in Example 1-1 except that the shape of the mask for laser processing was changed so as to change the shape and dimension of the concavity as shown below.
<Shape and Dimension of Concavity>
 schematic view of the opening 175: FIG. 10(a)
 minimum radius of curvature of the connection 178 $r_2$: 20 μm
 maximum length of the concavity 170 in Y direction: 210 μm
 maximum length of the concavity 170 in X direction: 125 μm
 depth of the concavity 170: 65 μm
Regarding the connection 176 of the opening 175, the connection of the opening of the concavity 170 in the interfacial plane between the clad layer 12 and the core layer 13, and the connection of the bottom of the concavity 170, the minimum radius curvature thereof was 20 μm.

Example 2-3

An optical waveguide was obtained in the same manner as in Example 1-1 except that the shape of the mask for laser processing was changed so as to change the shape and dimension of the concavity as shown below.
<Shape and Dimension of Concavity>
 schematic view of the opening 175: FIG. 10(a)
 minimum radius of curvature of the connection 178 $r_2$: 40 μm
 maximum length of the concavity 170 in Y direction: 210 μm
 maximum length of the concavity 170 in X direction: 125 μm
 depth of the concavity 170: 65 μm
Regarding the connection 176 of the opening 175, the connection of the opening of the concavity 170 in the interfacial plane between the clad layer 12 and the core layer 13, and the connection of the bottom of the concavity 170, the minimum radius curvature thereof was 40 μm.

Example 2-4

An optical waveguide was obtained in the same manner as in Example 1-1 except that the shape of the mask for laser processing was changed so as to change the shape and dimension of the concavity as shown below.
<Shape and Dimension of Concavity>
  schematic view of the opening 175: FIG. 10(a)
  minimum radius of curvature of the connection 178 $r_2$: 100 μm
  maximum length of the concavity 170 in Y direction: 900 μm
  maximum length of the concavity 170 in X direction: 200 μm
  depth of the concavity 170: 65 μm
Regarding the connection 176 of the opening 175, the connection of the opening of the concavity 170 in the interfacial plane between the clad layer 12 and the core layer 13, and the connection of the bottom of the concavity 170, the minimum radius curvature thereof was 100 μm.

Example 3-1

An optical waveguide was obtained in the same manner as in Example 1-1 except that a concavity as shown below was formed by cut processing and grinding processing.
<Shape and Dimension of Concavity>
  schematic view of the opening 175: FIG. 4
  minimum radius of curvature of the connection 178 $r_2$: 40 μm
  minimum radius of curvature of the connection 176 $r_2$: 80 μm
  minimum radius curvature of the connection of the opening of the concavity 170 in the interfacial plane between the clad layer 12 and the core layer 13: 80 μm
  minimum radius curvature of the connection of the bottom of the concavity 170: 40 μm
  shape of edge of the opening 175: arc (radius of curvature of arc: 45 μm)
  maximum length of the concavity 170 in Y direction: 210 μm
  maximum length of the concavity 170 in X direction: 160 μm
  depth of the concavity 170: 65 μm

Example 3-2

An optical waveguide was obtained in the same manner as in Example 1-1 except that a concavity as shown below was formed by cut processing and grinding processing, and the distance P between the core portions was changed to 500 μm.
<Shape and Dimension of Concavity>
  schematic view of the opening 175: FIG. 4
  minimum radius of curvature of the connection 178 $r_2$: 300 μm
  minimum radius of curvature of the connection 176 $r_1$: 475 μm
  minimum radius curvature of the connection of the opening of the concavity 170 in the interfacial plane between the clad layer 12 and the core layer 13: 475 μm
  minimum radius curvature of the connection of the bottom of the concavity 170: 300 μm
  shape of edge of the opening 175: arc (radius of curvature of arc: 300 μm)
  maximum length of the concavity 170 in Y direction: 210 μm
  maximum length of the concavity 170 in X direction: 950 μm
  depth of the concavity 170: 65 μm

Example 4

An optical waveguide was obtained in the same manner as in Example 1-1 except that the concavity was formed at the side clad portion positioned on an extension line from the core portion and the shape of the mask for laser processing was changed so as to change the shape and dimension of the concavity as shown below.
<Shape and Dimension of Concavity>
  schematic view of the opening 175: FIG. 4
  minimum radius of curvature of the connection 178 $r_2$: 20 μm
  shape of edge of the opening 175: arc (radius of curvature of arc: 20 μm)
  maximum length of the concavity 170 in Y direction: 210 μm
  maximum length of the concavity 170 in X direction: 115 μm
  depth of the concavity 170: 65 μm
Regarding the connection 176 of the opening 175, the connection of the opening of the concavity 170 in the interfacial plane between the clad layer 12 and the core layer 13, and the connection of the bottom of the concavity 170, the minimum radius curvature thereof was 20 μm.

Example 5-1

An optical waveguide was obtained in the same manner as in Example 1-1 except that the shape of the concavity was changed to a triangle shape with its apex being located at the bottom of the concavity as viewed with respect to a section cut along the plane which orthogonally intersects the upper surface of the clad layer 12 and is parallel to the longitudinal direction of the core portion 14, and the shape of the mask for laser processing was changed so as to change the shape and dimension of the concavity as shown below.
<Shape and Dimension of Concavity>
  schematic view of the opening 175: FIG. 4
  minimum radius of curvature of the connection 178 $r_2$: 20 μm
  shape of edge of the opening 175: arc (radius of curvature of arc: 40 μm)
  maximum length of the concavity 170 in Y direction: 210 μm
  maximum length of the concavity 170 in X direction: 115 μm
  depth of the concavity 170: 65 μm
Regarding the connection 176 of the opening 175, the connection of the opening of the concavity 170 in the interfacial plane between the clad layer 12 and the core layer 13, and the connection of the bottom of the concavity 170, the minimum radius curvature thereof was 20 μm.

Example 5-2

An optical waveguide was obtained in the same manner as in Example 1-1 except that the shape of the mask for laser processing was changed so as to change the shape of the concavity as shown below.
<Shape and Dimension of Concavity>
  schematic view of the opening 175: FIG. 4
  minimum radius of curvature of the connection 178 $r_2$: 100 μm shape of edge of the opening 175: arc (radius of curvature of arc: 150 μm)

maximum length of the concavity 170 in Y direction: 210 μm maximum length of the concavity 170 in X direction: 200 μm depth of the concavity 170: 65 μm Regarding the connection 176 of the opening 175, the connection of the opening of the concavity 170 in the interfacial plane between the clad layer 12 and the core layer 13, and the connection of the bottom of the concavity 170, the minimum radius curvature thereof was 100 μm.

Example 6-1

An optical waveguide was obtained in the same manner as in Example 1-1 except that the shape of the mask for laser processing was changed so as to change the shape and dimension of the concavity as shown below.

<Shape and Dimension of Concavity>
schematic view of the opening 175: FIG. 10(*b*)

minimum radius of curvature of the connection 178 being an acute $r_2'$: 0.5 μm minimum radius of curvature of the connection 178 being an obtuse $r_2''$: 15.4 μm shape of edge of the opening 175: arc (radius of curvature of arc: 14.2 μm)

maximum length of the concavity 170 in Y direction: 80 μm maximum length of the concavity 170 in X direction: 105 μm depth of the concavity 170: 60 μm Regarding the connection 176 of the opening 175, the connection of the opening of the concavity in the interfacial plane between the clad layer 12 and the core layer 13, and the connection of the bottom of the concavity 170, the minimum radius curvature thereof was the same as the connection 178 corresponding thereto.

Example 6-2

An optical waveguide was obtained in the same manner as in Example 1-1 except that the shape of the mask for laser processing was changed so as to change the shape and dimension of the concavity as shown below.

<Shape and Dimension of Concavity>
schematic view of the opening 175: FIG. 10(*b*)

minimum radius of curvature of the connection 178 being an acute $r_2'$: 1.5 μm minimum radius of curvature of the connection 178 being an obtuse $r_2''$: 45.3 μm shape of edge of the opening 175: arc (radius of curvature of arc 50.46 μm)

maximum length of the concavity 170 in Y direction: 80 μm maximum length of the concavity 170 in X direction: 135 μm depth of the concavity 170: 60 μm Regarding the connection 176 of the opening 175, the connection of the opening of the concavity in the interfacial plane between the clad layer 12 and the core layer 13, and the connection of the bottom of the concavity 170, the minimum radius curvature thereof was the same as the connection 178 corresponding thereto.

Example 6-3

An optical waveguide was obtained in the same manner as in Example 1-1 except that the shape of the mask for laser processing was changed so as to change the shape and dimension of the concavity as shown below.

<Shape and Dimension of Concavity>
schematic view of the opening 175: FIG. 10(*b*)

minimum radius of curvature of the connection 178 being an acute $r_2'$: 3.3 μm minimum radius of curvature of the connection 178 being an obtuse $r_2''$: 8.5 μm shape of edge of the opening 175: arc (radius of curvature of arc: 4.3 μm)

maximum length of the concavity 170 in Y direction: 140 μm maximum length of the concavity 170 in X direction: 160 μm depth of the concavity 170: 60 μm Regarding the connection 176 of the opening 175, the connection of the opening of the concavity in the interfacial plane between the clad layer 12 and the core layer 13, and the connection of the bottom of the concavity 170, the minimum radius curvature thereof was the same as the connection 178 corresponding thereto.

Example 6-4

An optical waveguide was obtained in the same manner as in Example 1-1 except that the shape of the mask for laser processing was changed so as to change the shape and dimension of the concavity as shown below.

<Shape and Dimension of Concavity>
schematic view of the opening 175: FIG. 10(*b*)

minimum radius of curvature of the connection 178 being an acute $r_2'$: 4.2 μm minimum radius of curvature of the connection 178 being an obtuse $r_2''$: 10.3 μm shape of edge of the opening 175: arc (radius of curvature of arc: 4.3 μm)

maximum length of the concavity 170 in Y direction: 140 μm maximum length of the concavity 170 in X direction: 160 μm depth of the concavity 170: 60 μm Regarding the connection 176 of the opening 175, the connection of the opening of the concavity in the interfacial plane between the clad layer 12 and the core layer 13, and the connection of the bottom of the concavity 170, the minimum radius curvature thereof was the same as the connection 178 corresponding thereto.

Example 6-5

An optical waveguide was obtained in the same manner as in Example 1-1 except that the shape of the mask for laser processing was changed so as to change the shape and dimension of the concavity as shown below.

<Shape and Dimension of Concavity>
schematic view of the opening 175: FIG. 10(*b*)

minimum radius of curvature of the connection 178 being an acute $r_2'$: 6.2 μm minimum radius of curvature of the connection 178 being an obtuse $r_2''$: 19.1 μm shape of edge of the opening 175: arc (radius of curvature of arc: 4.3 μm)

maximum length of the concavity 170 in Y direction: 140 μm maximum length of the concavity 170 in X direction: 160 μm depth of the concavity 170: 60 μm Regarding the connection 176 of the opening 175, the connection of the opening of the concavity in the interfacial plane between the clad layer 12 and the core layer 13, and the connection of the bottom of the concavity 170, the minimum radius curvature thereof was the same as the connection 178 corresponding thereto.

Example 6-6

An optical waveguide was obtained in the same manner as in Example 1-1 except that the shape of the mask for laser processing was changed so as to change the shape and dimension of the concavity as shown below.
<Shape and Dimension of Concavity>
  schematic view of the opening 175: FIG. 10(*b*)
  minimum radius of curvature of the connection 178 being an acute $r_2'$: 16.0 μm
  minimum radius of curvature of the connection 178 being an obtuse $r_2''$: 35.0 μm
  shape of edge of the opening 175: arc (radius of curvature of arc: 4.3 μm)
  maximum length of the concavity 170 in Y direction: 140 μm
  maximum length of the concavity 170 in X direction: 160 μm
  depth of the concavity 170: 60 μm
Regarding the connection 176 of the opening 175, the connection of the opening of the concavity in the interfacial plane between the clad layer 12 and the core layer 13, and the connection of the bottom of the concavity 170, the minimum radius curvature thereof was the same as the connection 178 corresponding thereto.

Example 6-7

An optical waveguide was obtained in the same manner as in Example 1-1 except that the shape of the mask for laser processing was changed so as to change the shape and dimension of the concavity as shown below.
<Shape and Dimension of Concavity>
  schematic view of the opening 175: FIG. 10(*b*)
  minimum radius of curvature of the connection 178 being an acute $r_2'$: 18.9 μm
  minimum radius of curvature of the connection 178 being an obtuse $r_2''$: 40.6 μm
  shape of edge of the opening 175: arc (radius of curvature of arc: 4.3 μm)
  maximum length of the concavity 170 in Y direction: 140 μm
  maximum length of the concavity 170 in X direction: 160 μm
  depth of the concavity 170: 60 μm
Regarding the connection 176 of the opening 175, the connection of the opening of the concavity in the interfacial plane between the clad layer 12 and the core layer 13, and the connection of the bottom of the concavity 170, the minimum radius curvature thereof was the same as the connection 178 corresponding thereto.

Example 6-8

An optical waveguide was obtained in the same manner as in Example 1-1 except that the shape of the mask for laser processing was changed so as to change the shape and dimension of the concavity as shown below.
<Shape and Dimension of Concavity>
  schematic view of the opening 175: FIG. 10(*b*)
  minimum radius of curvature of the connection 178 being an acute $r_2'$: 43.0 μm
  minimum radius of curvature of the connection 178 being an obtuse $r_2''$: 147.0 μm
  shape of edge of the opening 175: arc (radius of curvature of arc: 4.3 μm)
  maximum length of the concavity 170 in Y direction: 140 pin
  maximum length of the concavity 170 in X direction: 160 pin
  depth of the concavity 170: 60 μm
Regarding the connection 176 of the opening 175, the connection of the opening of the concavity in the interfacial plane between the clad layer 12 and the core layer 13, and the connection of the bottom of the concavity 170, the minimum radius curvature thereof was the same as the connection 178 corresponding thereto.

Comparative Example 1

An optical waveguide was obtained in the same manner as in Example 1-1 except that the shape of the mask for laser processing was changed so as to change the shape and dimension of the concavity as shown below.
<Shape and Dimension of Concavity>
  outline shape of the opening 175: FIG. 4
  minimum radius of curvature of the connection 178 $r_2$: 0.5 μm
  shape of edge of the opening 175: arc (radius of curvature of arc 3.13 μm)
  maximum length of the concavity 170 in Y direction: 210 μm
  maximum length of the concavity 170 in X direction: 510 μm
  depth of the concavity 170: 65 μm
Regarding the connection 176 of the opening 175, the connection of the opening of the concavity in the interfacial plane between the clad layer 12 and the core layer 13, and the connection of the bottom of the concavity 170, the minimum radius curvature thereof was 0.5 μm.

Comparative Example 2

An optical waveguide was obtained in the same manner as in Comparative Example 1 except that the distance P between the core portions was changed to 500 μm.

Comparative Example 3

An optical waveguide was obtained in the same manner as in Example 1-1 except that the shape of the mask for laser processing was changed so as to change the shape and dimension of the concavity as shown below.
<Shape and Dimension of Concavity>
  outline shape of the opening 175: FIG. 4
  minimum radius of curvature of the connection 178 $r_2$: 510 μm
  shape of edge of the opening 175: arc (radius of curvature of arc: 510 μm)
  maximum length of the concavity 170 in Y direction: 210 μm
  maximum length of the concavity 170 in X direction: 520 μm
  depth of the concavity 170: 65 μm Regarding the connection 176 of the opening 175, the connection of the opening of the concavity 170 in the interfacial plane between the clad layer 12 and the core layer 13, and the connection of the bottom of the concavity 170, the minimum radius curvature thereof was 410 µm.

Comparative Example 4

An optical waveguide was obtained in the same manner as in Comparative Example 3 except that the distance P between the core portions was changed to 500 µm.

2. Evaluation of Optical Waveguide

With respect to each of the optical waveguides obtained in the Examples and the Comparative Examples, the durability was evaluated by comparison of the transmission characteristic between before and after a heat cycle test. The conditions for the heat cycle test were shown below.

Conditions for the Heat Cycle Test>
  Temperature: −40 to 125° C.
  number of cycle: 500 cycles (30 minutes of high temperature and 30 minutes of low temperature for each cycle)

Evaluated characteristic: insertion loss

The result of the evaluation are shown in Tables 1, 2 and 3. The results of the evaluation are shown in Tables 1, 2 and 3. In Tables 1, 2 and 3, the "schematic view" means the schematic view of the opening 175, "$r_2$" is the minimum radius curvature of the connection 178, $r_1$ is the minimum radius curvature of the connection 176, "$r_3$" is the minimum radius curvature of the connection of the opening of the concavity 170 in the interfacial plane between the clad layer 12 and the core layer 13, "$r_4$" is the minimum radius curvature of the connection of the bottom of the concavity 170, the "edge contour" is the contour of the edge part of the opening 175, the "radius of curvature of arc" is the radius of curvature of arc of the edge part of the opening 175, "Y" is the maximum length of the concavity 170 in the Y direction, "X" is the maximum length of the concavity 170 in the X direction, the "depth" is the maximum depth of the concavity 170, and "P" is the distance between the core portions. "$r_2{'}$" is the minimum radius of curvature of the connection 178 which forms an acute angle in an approximate trapezoid, "$r_2{''}$" is the minimum radius of curvature of the connection 178 which forms an obtuse angle in an approximate trapezoid.

TABLE 1

| | schematic view | $r_2$ (µm) | $r_1$ (µm) | $r_3$ (µm) | $r_4$ (µm) | edge contour | radius of curvature of arc (µm) | Y (µm) | X (µm) | depth (µm) | P (µm) | Change of insertion loss (%) |
|---|---|---|---|---|---|---|---|---|---|---|---|---|
| Example 1-1 | FIG. 4 | 5 | 5 | 5 | 5 | arc | 125 | 210 | 105 | 65 | 250 | 0 |
| Example 1-2 | FIG. 4 | 20 | 20 | 20 | 20 | arc | 66.25 | 210 | 115 | 65 | 250 | 0 |
| Example 1-3 | FIG. 4 | 40 | 40 | 40 | 40 | arc | 48.33 | 210 | 125 | 65 | 250 | 0 |
| Example 1-4 | FIG. 4 | 1 | 1 | 1 | 1 | arc | 6.33 | 210 | 105 | 65 | 250 | 0 |
| Example 1-5 | FIG. 4 | 100 | 100 | 100 | 100 | arc | 120 | 210 | 200 | 65 | 250 | 0 |
| Example 1-6 | FIG. 4 | 300 | 300 | 300 | 300 | arc | 340 | 210 | 640 | 65 | 500 | 0 |
| Example 1-7 | FIG. 4 | 450 | 450 | 450 | 450 | arc | 580 | 210 | 900 | 65 | 500 | 0 |
| Example 1-8 | FIG. 4 | 100 | 100 | 100 | 100 | arc | 120 | 900 | 200 | 65 | 250 | 0 |

TABLE 2

| | schematic view | $r_2$ (µm) | $r_1$ (µm) | $r_3$ (µm) | $r_4$ (µm) | edge contour | radius of curvature of arc (µm) | Y (µm) | X (µm) | depth (µm) | P (µm) | Change of insertion loss (%) |
|---|---|---|---|---|---|---|---|---|---|---|---|---|
| Example 2-1 | FIG. 10(a) | 5 | 5 | 5 | 5 | — | — | 210 | 125 | 65 | 250 | 0 |
| Example 2-2 | FIG. 10(a) | 20 | 20 | 20 | 20 | — | — | 210 | 125 | 65 | 250 | 0 |
| Example 2-3 | FIG. 10(a) | 40 | 40 | 40 | 40 | — | — | 210 | 125 | 65 | 250 | 0 |
| Example 2-4 | FIG. 10(a) | 100 | 100 | 100 | 100 | — | — | 900 | 200 | 65 | 250 | 0 |
| Example 3-1 | FIG. 4 | 40 | 80 | 80 | 40 | arc | 45 | 210 | 160 | 65 | 250 | 0 |
| Example 3-2 | FIG. 4 | 300 | 475 | 475 | 300 | arc | 300 | 210 | 950 | 65 | 500 | 0 |
| Example 4 | FIG. 4 | 20 | 20 | 20 | 20 | arc | 20 | 210 | 115 | 65 | 250 | 0 |
| Example 5-1 | FIG. 4 | 20 | 20 | 20 | 20 | arc | 40 | 210 | 115 | 65 | 250 | 0 |
| Example 5-2 | FIG. 4 | 100 | 100 | 100 | 100 | arc | 150 | 210 | 200 | 65 | 250 | 0 |
| Comparative Example 1 | FIG. 4 | 0.5 | 0.5 | 0.5 | 0.5 | arc | 3.13 | 210 | 510 | 65 | 250 | 30 |
| Comparative Example 2 | FIG. 4 | 0.5 | 0.5 | 0.5 | 0.5 | arc | 3.13 | 210 | 510 | 65 | 500 | 20 |
| Comparative Example 3 | FIG. 4 | 510 | 510 | 510 | 510 | arc | 510 | 210 | 520 | 65 | 250 | 100 |
| Comparative Example 4 | FIG. 4 | 510 | 510 | 510 | 510 | arc | 510 | 210 | 520 | 65 | 500 | 40 |

TABLE 3

| | schematic view | $r_2{'}$ (µm) | $r_2{''}$ (µm) | edge contour | radius of curvature of arc (µm) | Y (µm) | X (µm) | depth (µm) | P (µm) | Change of insertion loss (%) |
|---|---|---|---|---|---|---|---|---|---|---|
| Example 6-1 | FIG. 10(b) | 0.5 | 15.4 | arc | 14.2 | 80 | 105 | 60 | 250 | 0 |
| Example 6-2 | FIG. 10(b) | 1.5 | 45.3 | arc | 50.46 | 80 | 135 | 60 | 250 | 0 |

TABLE 3-continued

|  | schematic view | $r_2'$ (μm) | $r_2''$ (μm) | edge contour | radius of curvature of arc (μm) | Y (μm) | X (μm) | depth (μm) | P (μm) | Change of insertion loss (%) |
|---|---|---|---|---|---|---|---|---|---|---|
| Example 6-3 | FIG. 10(b) | 3.3 | 8.5 | arc | 4.3 | 140 | 160 | 60 | 250 | 0 |
| Example 6-4 | FIG. 10(b) | 4.2 | 10.3 | arc | 4.3 | 140 | 160 | 60 | 250 | 0 |
| Example 6-5 | FIG. 10(b) | 6.2 | 19.1 | arc | 4.3 | 140 | 160 | 60 | 250 | 0 |
| Example 6-6 | FIG. 10(b) | 16.0 | 35.0 | arc | 4.3 | 140 | 160 | 60 | 250 | 0 |
| Example 6-7 | FIG. 10(b) | 18.9 | 40.6 | arc | 4.3 | 140 | 160 | 60 | 250 | 0 |
| Example 6-8 | FIG. 10(b) | 43.0 | 147.0 | arc | 4.3 | 140 | 160 | 60 | 250 | 0 |

The evaluation test were performed on the optical waveguides 1-1', 1-2', 1-3', and 2-4 provided with the support film 2 and the cover film 3 as shown in FIG. 7 in the condition similarly to Examples 1-1, 1-2, 1-3, and 2-4. Here, the minimum radius of curvature at a connection of the opening of the concavity penetrating the cover film 3 was made the same as the minimum radius $r_2$ of the connection 178 in the opening. The results of the evaluation are shown in Table 4.

TABLE 4

|  | schematic view | $r_2$ (μm) | $r_1$ (μm) | $r_3$ (μm) | $r_4$ (μm) | edge contour | radius of curvature of arc (μm) | Y (μm) | X (μm) | depth (μm) | Change of insertion loss (%) |
|---|---|---|---|---|---|---|---|---|---|---|---|
| Example 1-1' | FIG. 4 | 5 | 5 | 5 | 5 | arc | 125 | 210 | 105 | 65 | 0 |
| Example 1-2' | FIG. 4 | 20 | 20 | 20 | 20 | arc | 66.25 | 210 | 115 | 65 | 0 |
| Example 1-3' | FIG. 4 | 40 | 40 | 40 | 40 | arc | 48.33 | 210 | 125 | 65 | 0 |
| Example 2-4' | FIG. 10(a) | 100 | 100 | 100 | 100 | — | — | 900 | 200 | 65 | 0 |

The results of evaluation show that in the case of the optical waveguides obtained in the Examples, there was no significant change in the insertion loss between before and after the heat cycle test.

On the other hand, the insertion loss after the heat cycle test was greatly increased in the case of the optical waveguides of Comparative Examples 1 to 4. The difference amounted to 20 to 100% of the measured value before the test. In the observation of the cross section of the optical waveguide cut in the thicknesswise direction after the test, it was found that a delamination occurred between the core and the clad layer.

From the above, it was found that the optical waveguide of the present invention can realize high-quality optical communication while suppressing degradation of the transmission characteristic and reflection characteristic even after the heat cycle test.

INDUSTRIAL APPLICABILITY

According to the present invention, it is possible to obtain an optical waveguide enabling high-quality optical communication while suppressing degradation of the transmission characteristic. According to the present invention, it is also possible to obtain a highly reliable electronic device which is provided with the optical waveguide.

Therefore, the present invention is favorably applicable in the fields of the optical waveguide and the electronic device, and extremely important in industry.

1 optical waveguide
2 support film
3 cover film
10 laminated body
11 clad layer
12 clad layer
13 core layer
14 core portion
15 side clad portion
170 concavity
171 inclined plane
171a inclined plane top end
171a' left end
171a" right end
171b straight line segment
171b' left end
171b" right end
172 inclined plane
172a inclined plane top end
172a' left end
172a" right end
172b straight line segment
172b' left end
172b" right end
173 upright plane
173' inclined plane
173a upright plane top end
173b arc
174 upright plane
174' inclined plane
174a upright plane top end
174b arc
175 opening
176 connection
177 opening
178 connection
900 laser processor
910 mask for laser machining
911 shelding part
912 transmission part
L laser
$r_1$, $r_2$ radius of curvature

The invention claimed is:
1. An optical waveguide, comprising:
a laminated body comprising a core layer having a core portion, a first clad layer formed on one surface of the core layer, and a second clad layer formed on another surface of the core layer, and having a hollow section penetrating through the second clad layer and the core layer and extending to a middle portion of the first clad layer such that the laminated body has an inner wall surface defining the hollow section, wherein the inner wall surface includes an inclined plane which is inclined relative to and intersecting an interfacial plane between the core layer and the first clad layer, and the inner wall surface has a plurality of connection portions formed between the inclined plane and other portions of the inner wall surface such that each of the connection portions has a minimum radius of curvature in a range of 1 µm to 500 µm as measured at the interfacial plane.

2. The optical waveguide according to claim 1, wherein the laminated body has the hollow section formed at the core portion or at a position extended longitudinally from the core portion such that the inclined plane is traversing an optical axis of the core portion or a line extended from the optical axis of the core portion.

3. The optical waveguide according to claim 1, wherein each of the connection portions has a minimum radius of curvature in a range of 1 µm to 500 µm as measured at a surface of the second clad layer.

4. The optical waveguide according to claim 1, wherein each of the connection portions has a minimum radius in a range of 1 µm to 500 µm as measured at an interfacial plane between the second clad layer and the core layer.

5. The optical waveguide according to claim 1, further comprising:
a cover layer laminated on the second clad layer on an opposite side with respect to the core layer.

6. The optical waveguide according to claim 1, wherein the other portions of the inner wall surface include an upright plane intersecting the interfacial plane at an acute angle in a range of 60° to 90°.

7. The optical waveguide according to claim 1, wherein the hollow section is formed in the laminated body such that the inclined plane is intersecting the interfacial plane at an acute angle in a range of 20° to 90°.

8. The optical waveguide according to claim 6, wherein the inner wall surface includes the inclined plane in a pair and the upright plane in a pair such that the pair of inclined planes are positioned opposite to each other and the pair of upright planes are positioned opposite to each other.

9. The optical waveguide according to claim 6, wherein the upright plane is curved along a longitudinal direction of the laminated body.

10. The optical waveguide according to claim 1, wherein the hollow section is formed in the laminated body such that the inner wall surface is forming an acute angle with the interfacial plane.

11. An electronic device, comprising:
the optical waveguide according to claim 1.

12. The optical waveguide according to claim 2, wherein each of the connection portions has a minimum radius of curvature in a range of 1 µm to 500 µm as measured at a surface of the second clad layer.

13. The optical waveguide according to claim 2, wherein each of the connection portions has a minimum radius of curvature in a range of 1 µm to 500 µm as measured at an interfacial plane between the second clad layer and the core layer.

14. The optical waveguide according to claim 3, wherein each of the connection portions has a minimum radius of curvature in a range of 1 µm to 500 µm as measured at an interfacial plane between the second clad layer and the core layer.

15. The optical waveguide according to claim 14, further comprising:
a cover layer laminated on the second clad layer on an opposite side with respect to the core layer.

16. The optical waveguide according to claim 15, wherein the other portions of the inner wall surface include an upright plane intersecting the interfacial plane at an acute angle in a range of 60° to 90°.

17. The optical waveguide according to claim 16, wherein the hollow section is formed in the laminated body such that the inclined plane is intersecting the interfacial plane at an acute angle in a range of 20° to 90°.

18. The optical waveguide according to claim 17, wherein the inner wall surface includes the inclined plane in a pair and the upright plane in a pair such that the pair of inclined planes are positioned opposite to each other and the pair of upright planes are positioned opposite to each other.

19. The optical waveguide according to claim 6, wherein the upright plane is curved along a longitudinal direction of the laminated body, and each of the core layer, first clad layer and second clad layer comprises a resin material.

20. The optical waveguide according to claim 1, wherein the hollow section is formed in the laminated body such that the inner wall surface is forming an acute angle with the interfacial plane, and each of the core layer, first clad layer and second clad layer comprises a resin material.

* * * * *